(12) United States Patent
Foxhoven et al.

(10) Patent No.: US 10,728,287 B2
(45) Date of Patent: Jul. 28, 2020

(54) CLOUD BASED SECURITY USING DNS

(71) Applicant: Zscaler, Inc., San Jose, CA (US)

(72) Inventors: Patrick Foxhoven, San Jose, CA (US);
John Chanak, Saratoga, CA (US);
William Fehring, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 36 days.

(21) Appl. No.: 15/645,519

(22) Filed: Jul. 10, 2017

(65) Prior Publication Data

US 2017/0310709 A1   Oct. 26, 2017

Related U.S. Application Data

(63) Continuation-in-part of application No. 14/450,358, filed on Aug. 4, 2014, now Pat. No. 9,705,922, and a continuation-in-part of application No. 13/948,362, filed on Jul. 23, 2013, now Pat. No. 9,882,767.

(51) Int. Cl.
| | |
|---|---|
| *G06F 15/173* | (2006.01) |
| *H04L 29/06* | (2006.01) |
| *H04L 29/12* | (2006.01) |
| *H04L 29/08* | (2006.01) |

(52) U.S. Cl.
CPC .......... *H04L 63/20* (2013.01); *H04L 61/1511* (2013.01); *H04L 63/08* (2013.01); *H04L 63/10* (2013.01); *H04L 63/102* (2013.01); *H04L 61/1552* (2013.01); *H04L 61/2514* (2013.01); *H04L 67/10* (2013.01)

(58) Field of Classification Search
CPC ............... H04L 29/12066; H04L 67/02; H04L 2463/102
See application file for complete search history.

(56) References Cited

U.S. PATENT DOCUMENTS

| | | | | |
|---|---|---|---|---|
| 6,961,783 | B1 * | 11/2005 | Cook | ................ H04L 29/12066 709/223 |
| 8,887,249 | B1 * | 11/2014 | Schekochikhin | ..... H04L 63/083 726/5 |
| 8,892,766 | B1 * | 11/2014 | Wei | ..................... H04L 63/1408 706/22 |
| 9,137,131 | B1 | 9/2015 | Sarukkai et al. | |
| 9,197,628 | B1 * | 11/2015 | Hastings | ............. H04L 63/0254 |
| 9,203,847 | B2 * | 12/2015 | Elleboe | ................ H04L 63/101 |
| 9,749,336 | B1 * | 8/2017 | Zhang | .................... H04L 63/14 |

(Continued)

FOREIGN PATENT DOCUMENTS

WO    WO-2014043032 A1 *  3/2014   ......... H04L 63/1441

*Primary Examiner* — Umar Cheema
*Assistant Examiner* — Tesfu N Mekonen
(74) *Attorney, Agent, or Firm* — Clements Bernard Walker; Lawrence A. Baratta, Jr.

(57) ABSTRACT

A cloud-based security method using Domain Name System (DNS) includes receiving a request from a user device at a DNS server; performing a security check on the request based on a policy look up associated with the user device; responsive to the policy look up, performing a DNS security check on the request; and responsive to the DNS security check, performing one of allowing the request to the Internet; blocking the request based on the policy; and providing the request to inline inspection based on the policy, wherein the request is one of allowed to the Internet or blocked based on the inline inspection.

20 Claims, 14 Drawing Sheets

(56) References Cited

U.S. PATENT DOCUMENTS

| | | |
|---|---|---|
| 2002/0069278 A1 | 6/2002 | Forslöw |
| 2006/0013158 A1* | 1/2006 | Ahuja ................. H04L 12/4641 370/328 |
| 2006/0218625 A1 | 9/2006 | Pearson et al. |
| 2008/0201413 A1* | 8/2008 | Sullivan ............ H04L 29/12066 709/203 |
| 2009/0158430 A1* | 6/2009 | Borders ................ G06F 21/552 726/23 |
| 2009/0164597 A1* | 6/2009 | Shuster ............ H04L 29/12066 709/206 |
| 2009/0175514 A1 | 7/2009 | Zhao et al. |
| 2009/0262741 A1* | 10/2009 | Jungck ............ H04L 29/12066 370/392 |
| 2010/0031362 A1* | 2/2010 | Himberger ........ H04L 29/12066 726/25 |
| 2010/0125899 A1* | 5/2010 | Tinnakornsrisuphap .................... H04L 63/101 726/12 |
| 2010/0318631 A1 | 12/2010 | Shukla |
| 2011/0078309 A1* | 3/2011 | Bloch ............... H04L 29/12066 709/224 |
| 2011/0167474 A1 | 7/2011 | Sinha et al. |
| 2011/0191455 A1* | 8/2011 | Gardner ............ H04L 29/12066 709/223 |
| 2011/0225647 A1* | 9/2011 | Dilley ................ H04L 63/0218 726/14 |
| 2011/0282997 A1* | 11/2011 | Prince ................ H04L 63/1458 709/226 |
| 2012/0023153 A1* | 1/2012 | Karasaridis ......... H04L 61/1511 709/203 |
| 2012/0089713 A1* | 4/2012 | Carriere ............. H04L 12/4641 709/222 |
| 2012/0281706 A1* | 11/2012 | Agarwal ............. H04L 67/1002 370/395.53 |
| 2012/0303808 A1* | 11/2012 | Xie ..................... H04L 63/0236 709/225 |
| 2013/0179573 A1 | 7/2013 | McCarty |
| 2013/0198065 A1* | 8/2013 | McPherson ......... H04L 61/1511 705/40 |
| 2013/0204978 A1 | 8/2013 | Fleischman et al. |
| 2014/0019753 A1* | 1/2014 | Lowry .................. H04L 63/062 713/155 |
| 2014/0047532 A1 | 2/2014 | Sowatskey |
| 2014/0089661 A1* | 3/2014 | Mahadik ............. H04L 61/1511 713/162 |
| 2014/0223507 A1* | 8/2014 | Xu ...................... H04L 63/0272 726/1 |
| 2014/0259093 A1* | 9/2014 | Narayanaswamy .... H04L 47/20 726/1 |
| 2014/0304412 A1* | 10/2014 | Prakash ............. H04L 61/1511 709/226 |

\* cited by examiner

CLOUD BASED SECURITY USING DNS

CROSS-REFERENCE TO RELATED APPLICATION(S)

This patent/application is a continuation-in-part of co-pending U.S. patent application Ser. No. 13/948,362 filed Jul. 23, 2013, and entitled "DISTRIBUTED CLOUD-BASED DYNAMIC NAME SERVER SURROGATION SYSTEMS AND METHODS," and a continuation-in-part of co-pending U.S. patent application Ser. No. 14/450,358 filed Aug. 4, 2014, and entitled "CLOUD-BASED USER-LEVEL POLICY, REPORTING, AND AUTHENTICATION OVER DNS," the contents of each are incorporated in full by reference herein.

FIELD OF THE DISCLOSURE

The present disclosure relates generally to computer networking systems and methods. More particularly, the present disclosure relates to cloud-based security monitoring such as user-level policy, reporting, and authentication using Domain Name System (DNS).

BACKGROUND OF THE DISCLOSURE

Each host connected to the Internet has a unique Internet Protocol (IP) address in the textual form, translating it to an IP address (e.g., 205.186.173.184, 50.58.79.42, etc.) is a process known as DNS resolution or DNS lookup. Conventionally, there is no way to attribute DNS transactions to a specific user. The reason is simple—the DNS protocol itself was never intended to facilitate user-level visibility of who the transactions occurred from. The only source/user/requestor level information present in a DNS transaction is the source IP address that the request originated from. However, there is no direct way to correlate an IP address to a user. Additionally, IP addresses can and do change. This challenge is further complicated if a service external to the network wants visibility to attribute users to DNS transactions. The source IP address, in that case, is often meaningless if NAT (network address translation) is occurring. With NAT multiple users' DNS transactions will be translated to come from a single shared IP address. As a result, a source IP address can represent multiple users. It would be advantageous to specify each user to each DNS transaction such as for user-level differentiated policy and reporting with seamless/transparent authentication using a DNS-based system.

Additionally, during DNS resolution, a program that wishes to perform this translation contacts a DNS server that returns the translated IP address. In practice, the entire translation may not occur at a single DNS server; rather, a DNS server contacted initially may recursively call upon other DNS servers to complete the translation. For a more complex Uniform Resource Locator (URL) such as www.site.com/home/products, the crawler component responsible for DNS resolution extracts the host name—in this case, www.site.com—and looks up the IP address for the host www.site.com. DNS resolution today takes place in a very static model. A client requests resolution for a given domain name via its configured DNS server, the server recursively searches for that resolution and then returns the result to the client.

A challenge occurs in that many Internet services today rely on DNS (and the server recursion process) to provide localization of content as well as to optimize content delivery. For example for google.com, the recursion process may return a different IP address for a user located in the U.S. or even for a specific location in the U.S. versus a user in a foreign country. Content is geo-localized or routed to the best destination based on the source IP address of the DNS server that performed the recursion. This is primarily because to localize or optimize content based on DNS alone the only information present beyond the domain name being resolved recursively is the IP address that requested the resolution. As a result to provide the best experience possible (localized or optimized content delivery) DNS servers traditionally needed to be local to the clients that they are serving. Another challenge is how to effectively scale a DNS-policy driven infrastructure that is capable of supporting tens or hundreds of millions of devices. On the one hand, it is desired take all DNS traffic from a given device, all the time, to apply policy. On the other the hand, this must manage the load placed that infrastructure when it is adopted at any amount of scale. Having the ability to distribute the load becomes critical.

Finally, organizations also provide split horizon/differentiated DNS resolution based on where the client is. For example, the resolution of a particular domain name internal to a network may provide a different IP address than if it originated outside that network. Differentiated resolution can also occur in any application that needs to route traffic based factors other than locality or optimization. As a result, when building a service that is inherently based on DNS, that service either needs to be highly localized and massively distributed or have a way to take into account the need for localized recursion for requested destinations in the form of policy. Additionally, for the DNS service to remain operable, it needs to scale elastically and without limit.

The complexity of security threats facing enterprises today is only exceeded by the complexity of security solutions deployed to combat them. Small and medium-sized businesses can tie up significant resources trying to deploy complex security architectures intended for global companies, or settle for half-measures which rely on simplistic Uniform Resource Locator (URL) filtering and DNS-based block/allow solutions, providing a level of protection far short of real security. There is a need for a simplified and easy-to-deploy cloud security system. DNS advantageously is supported by an Internet device. It would be advantageous to leverage the ubiquity of DNS as a means for cloud-based security.

BRIEF SUMMARY OF THE DISCLOSURE

In an exemplary embodiment, a cloud-based security method using Domain Name System (DNS) includes receiving a request from a user device at a DNS server; performing a security check on the request based on a policy look up associated with the user device; responsive to the policy look up, performing a DNS security check on the request; and, responsive to the DNS security check, performing one of allowing the request to the Internet; blocking the request based on the policy; and providing the request to inline inspection based on the policy, wherein the request is one of allowed to the Internet or blocked based on the inline inspection.

In another exemplary embodiment, a Domain Name System (DNS) server configured to perform cloud-based security using DNS includes a network interface communicatively coupled to a user device via the Internet; a processor communicatively coupled to the network interface; and memory storing instructions that, when executed, cause the processor to receive a request from the user device; perform a security check on the request based on a policy look up associated with the user device; responsive to the policy look up, perform a DNS security check on the request; and, responsive to the DNS security check, perform one of allow the request to the Internet; block the request based on the policy; and provide the request to inline inspection based on the policy, wherein the request is one of allowed to the Internet or blocked based on the inline inspection.

In a further exemplary embodiment, a distributed security cloud configured to perform cloud-based security using Domain Name System (DNS) includes a DNS server communicatively coupled to a user device; a policy data store communicatively coupled to the DNS server and storing a policy for the user device; an inline inspection system communicatively coupled to the DNS server; wherein the DNS server is configured to receive a request from the user device; perform a security check on the request based on the policy associated with the user device; responsive to the policy, perform a DNS security check on the request; and, responsive to the DNS security check, perform one of allow the request to the Internet; block the request based on the policy; and provide the request to the inline inspection system based on the policy, wherein the request is one of allowed to the Internet or blocked based on the inline inspection system.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, cloud-based security monitoring is described using Domain Name System (DNS). Systems and methods support true security that is easy-to-deploy with advanced DNS-based URL filtering plus automated inline threat protection where required. The systems and methods provide a cloud-based, intelligent routing platform for true security. Beneficially, the systems and methods provide a simplified, lightweight, and easy-to-deploy approach. In an exemplary use case, the systems and methods can be deployed for cases outside of core employee protection, such as public WiFi, distributed employees, sensors, Internet-of-Things (IoT), etc. The key to the systems and methods is the use of DNS pointed at a distributed security cloud. Again, all Internet devices support DNS, and the setup is simple to point the device to an anycast DNS server associated with the distributed security cloud. The distributed security cloud is more than simple DNS, but also provides intelligent routing or "steering" of traffic—combining proxies and DNS. The systems and methods have performance benefits such as being lightweight and also preserves geo-localization.

Also, in various exemplary embodiments, cloud-based user-level policy, reporting, and authentication systems and methods over Domain Name System (DNS) is described. The systems and methods adapt DNS to support per-user identification of DNS requests. The systems and methods use the combination of an on-premise cloud-managed Virtual Machine (VM) and integrate it with a multi-tenant distributed cloud in order to fully and transparently authenticate users just by setting DNS to the cloud. This leverages the existing DNS protocol in a novel way—using it to authenticate users and provide cloud-based policy and reporting. Building such an architecture provides great simplicity to the end user to implement a cloud based content and security filtering service. Differentiated user-level content and security filtering policies are possible by purely setting DNS and without deploying any physical hardware on premise.

Exemplary Cloud System Architecture

Figure 1:
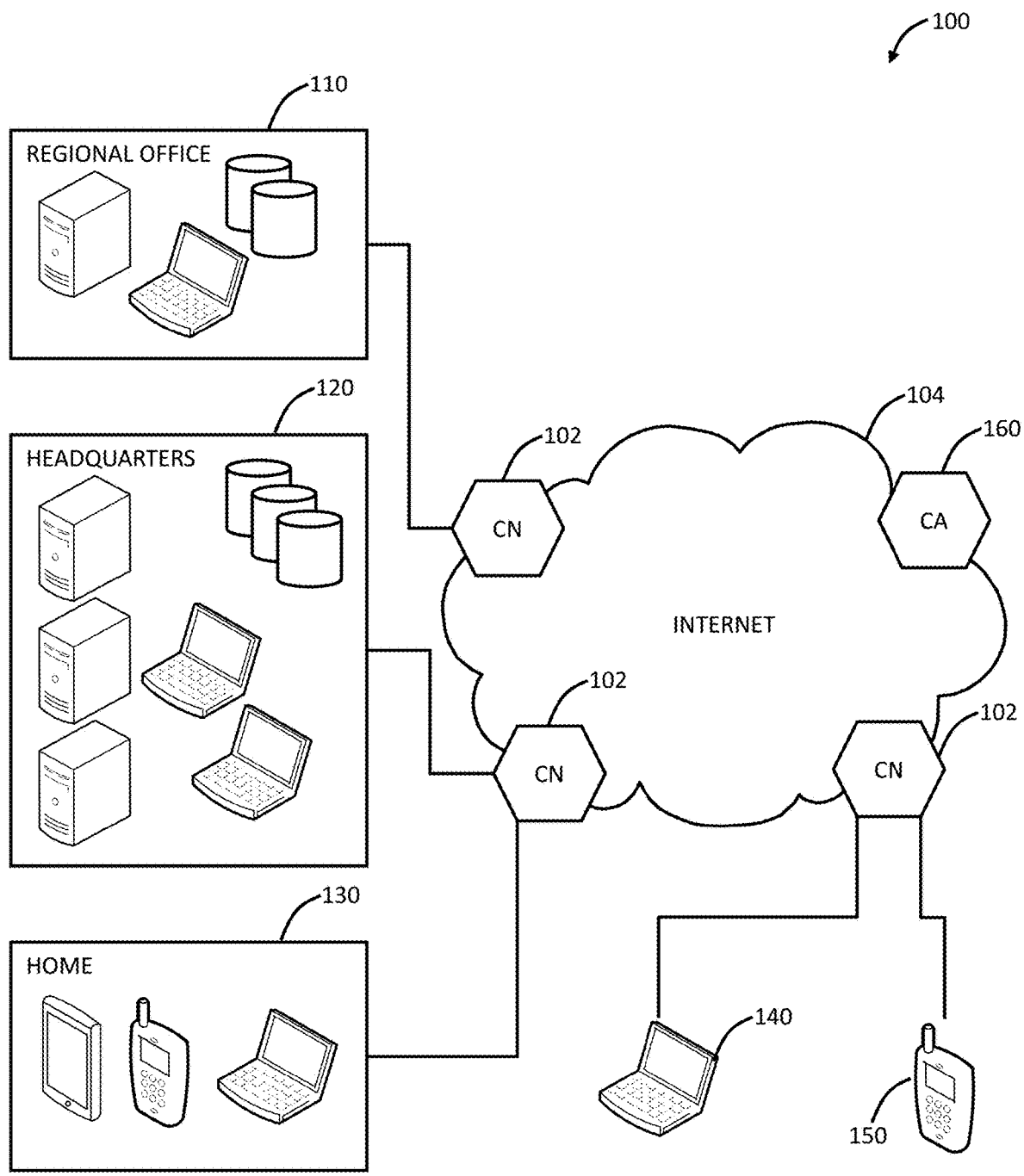
FIG. 1 is a network diagram of a cloud-based system.
Figure 3:
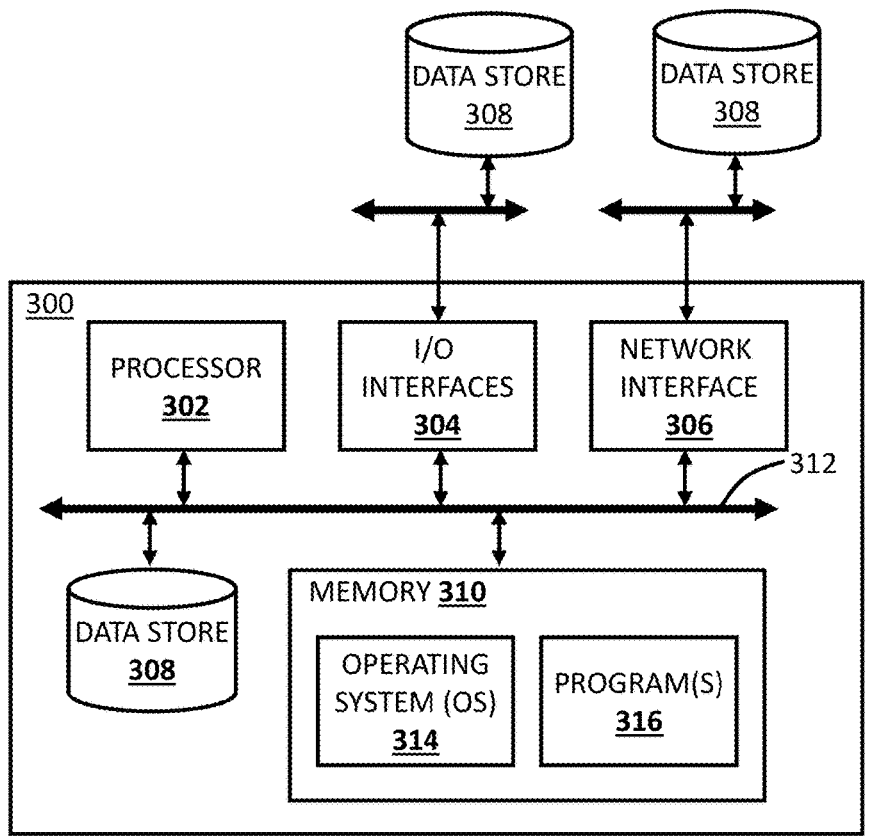
FIG. 3 is a block diagram of a server which may be used in the distributed security system of FIG. 1 or standalone.

Referring to FIG. 1, in an exemplary embodiment, a cloud system 100 is illustrated for implementing the cloud-based user-level policy, reporting, and authentication systems and methods over DNS and the like. The cloud system 100 includes one or more cloud nodes (CN) 102 communicatively coupled to the Internet 104. The cloud nodes 102 may be implemented as a server 300 (as illustrated in FIG. 3), or the like. That is, the cloud system 100 may be a distributed security system. In the cloud system 100, traffic from various locations (and various devices located therein) such as a regional office 110, headquarters 120, various employee's homes 130, mobile laptop 140, and mobile device 150 can be monitored or redirected to the cloud through the cloud nodes 102. That is, each of the locations 110, 120, 130, 140, 150 is communicatively coupled to the Internet 104 and can be monitored by the cloud nodes 102. The cloud system 100 may be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 100 may be viewed as Security-as-a-Service through the cloud. Existing cloud-based distributed security systems perform inline processing where all traffic is redirected through the cloud for proactive monitoring. In the various exemplary embodiments described herein, DNS is utilized for a less intrusive mechanism for a cloud-based distributed security system.

In an exemplary embodiment, the cloud system 100 can be configured to provide mobile device security and policy systems and methods. The mobile device 150 may be the mobile device 400 and may include common devices such as smartphones, tablets, netbooks, personal digital assistants, MP3 players, cell phones, e-book readers, and the like. The cloud system 100 is configured to provide security and policy enforcement for devices including the mobile devices 150 in the cloud. Advantageously, the cloud system 100 avoids platform specific security apps on the mobile devices 150, forwards web traffic through the cloud system 100, enables network administrators to define policies in the cloud, and enforces/cleans traffic in the cloud prior to delivery to the mobile devices 150. Further, through the cloud system 100, network administrators may define user centric policies tied to users, not devices, with the policies being applied regardless of the device used by the user. The cloud system 100 provides 24×7 security with no need for updates as the cloud system 100 is always up-to-date with current threats and without requiring device signature updates. Also, the cloud system 100 enables multiple enforcement points, centralized provisioning and logging, automatic traffic routing to a nearest cloud node 102, geographical distribution of the cloud nodes 102, policy shadowing of users which is dynamically available at the cloud nodes, etc.

In various exemplary embodiments, the cloud system 100 can be used to perform DNS cloud-based user-level policy, reporting, and authentication. Specifically, DNS can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the cloud based system 100 can be performed in an in-line manner, i.e. the cloud nodes 102 are in the data path of connecting users. Another approach can include a passive approach to the data path. DNS is one of the most fundamental IP protocols. With DNS as a technique, it is proposed to use DNS for dynamic routing of traffic, per user authentication and policy enforcement, and the like.

In conjunction with the cloud system 100, various techniques can be used for monitoring which is described on a sliding scale between always inline to never inline. First, in an always inline manner, all user traffic is between inline proxies such as the cloud nodes 102 without exception. Here, DNS can be used as a forwarding mechanism to the inline proxies. Second, in a somewhat always inline manner, all user traffic except for certain business partners or third party traffic is between inline proxies such as the cloud nodes 102. Third, in an inline manner for most traffic, high bandwidth applications can be configured to bypass the inline proxies such as the cloud nodes 102. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Using DNS, the cloud system 100 has to be able to distinguish between each individual user. Again, this is problematic in conventional operation as DNS does not enable per-user identification. Specifically, DNS requests/queries and replies use User Datagram Protocol (UDP). The general format of DNS messages is described in RFC 1035 and identification of the end user making a request is solely by an IP address, and as described herein, this is typically obfuscated by NAT.

Generally, the cloud system 100 may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud system 100 is illustrated herein as one exemplary embodiment of a cloud-based system and those of ordinary skill in the art will recognize the cloud based mobile device security and policy systems and methods contemplate operation on any cloud based system.

DNS Augmented Security+Cloud System

Figure 2:
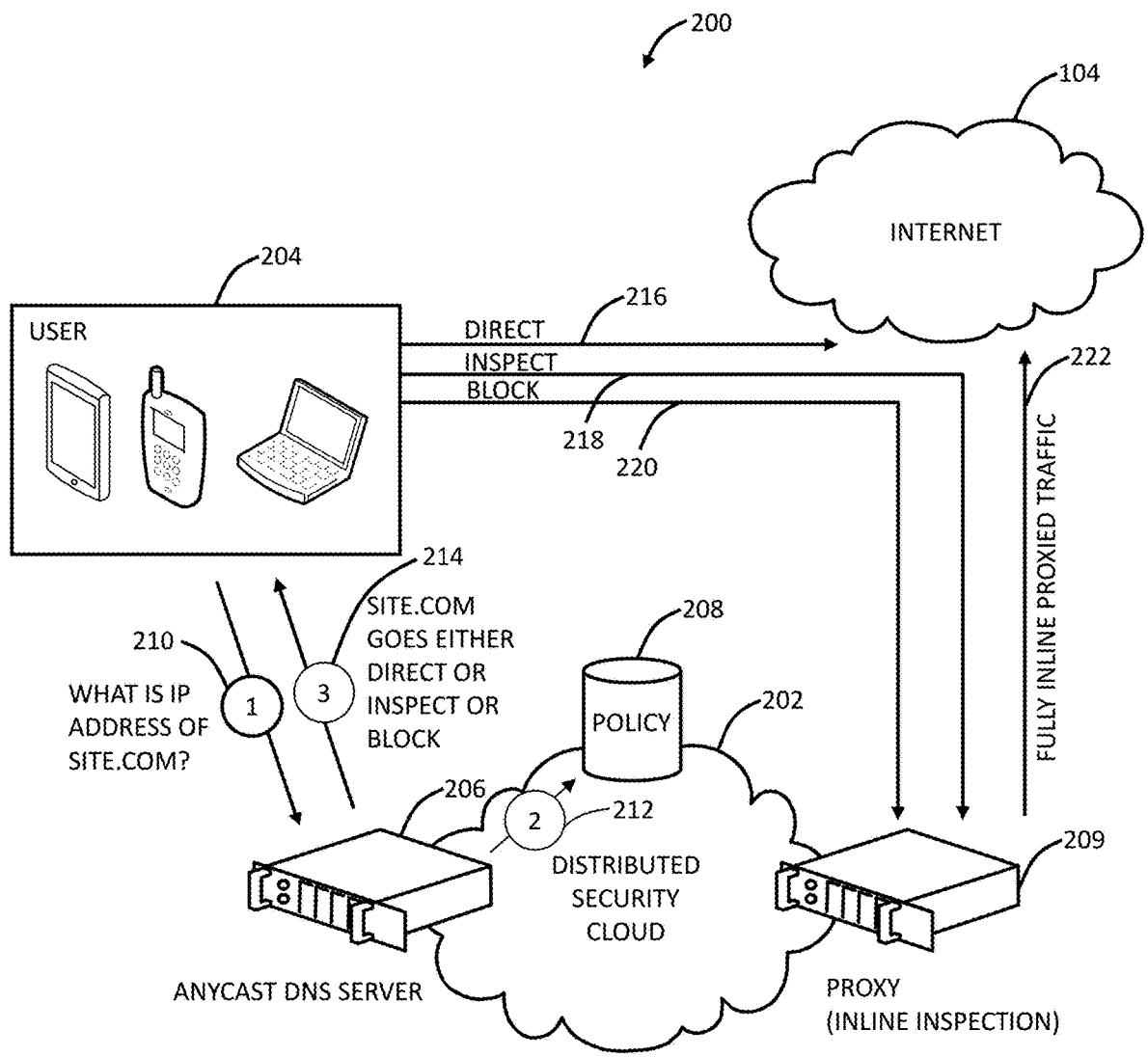
FIG. 2 is a network diagram of a network with a distributed security cloud providing DNS augmented security.

Referring to FIG. 2, in an exemplary embodiment, a network diagram illustrates a network 200 with a distributed security cloud 202 providing DNS augmented security. The network 200 includes a user device 204 connecting to the distributed security cloud 202 via an anycast DNS server 206. The anycast DNS server 206 can be a server such as the server 300 of FIG. 3. Also, the anycast DNS server 206 can be the cloud node 102, etc. The distributed security cloud 202 includes the anycast DNS server 206, policy data 208, and an inline proxy 210. The inline proxy 209 can include the cloud node 102, etc. In operation, the user device 204 is configured with a DNS entry for the anycast DNS server 206, and the anycast DNS server 206 can perform DNS surrogation as is described herein. The distributed security cloud 202 utilizes the anycast DNS server 206, the policy data 208, and the inline proxy 209 to perform the DNS augmented security.

The network 200 illustrates the DNS augmented security where DNS information is used as follows. First, at step 210, the user device 204 requests a DNS lookup of a site, e.g. "what is the IP address of site.com?" from the anycast DNS server 206. The anycast DNS server 206 accesses the policy data 208 to determine the policy associated with the site at step 212. The anycast DNS server 206 returns the IP address of the site based on the appropriate policy at step 214. The policy data 208 determines if the site either goes direct (step 216) to the Internet, is inspected by the inline proxy (step 218), or is blocked per policy (step 220). Here, the anycast DNS server 206 returns the IP address with additional information if the site is inspected or blocked. For example, if the anycast DNS server 206 determines the access is direct, the anycast DNS server 206 simply returns the IP address of the site. If the anycast DNS server 206 determines the site is blocked or inspected, the anycast DNS server 206 returns the IP address to the inline proxy 209 with additional information. The inline proxy 209 can block the site or provide fully inline proxied traffic to the site (step 222) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 200 can be used with the cloud system 100 to provide cloud-based security without requiring full inline connectivity.

Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Exemplary Mobile Device Architecture

Figure 4:
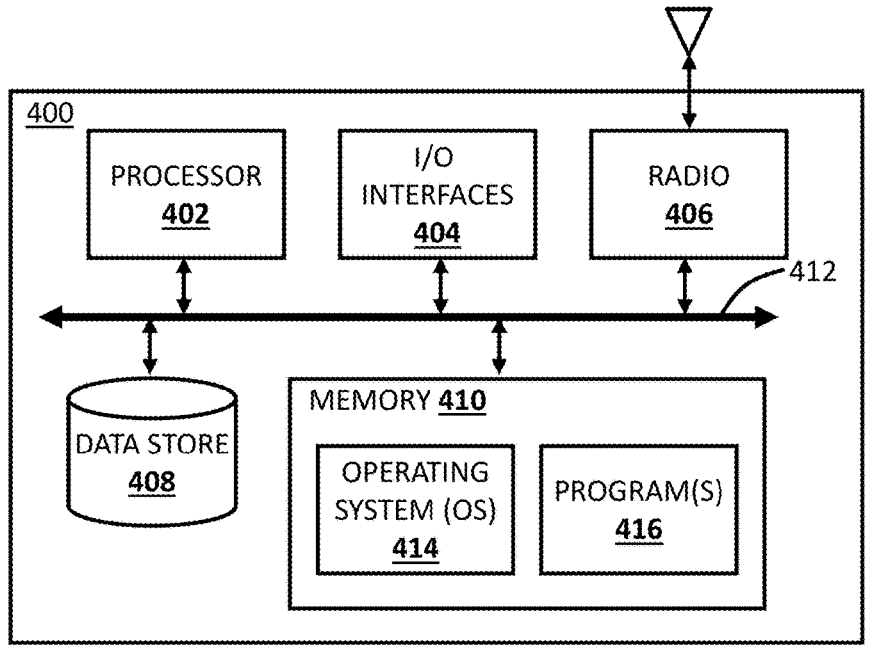
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410.

It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 402 is configured to execute software stored within the memory 410, to communicate data to and from the memory 410, and to generally control operations of the mobile device 410 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 410. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

Additionally, in various exemplary embodiments, the present disclosure relates to distributed cloud-based Doman Name Server (DNS) surrogation systems and methods. DNS surrogation is the idea that if a client sends a resolution request to a given DNS server, that server does not need to actually perform the recursion itself. A policy can be defined telling the server that first received the request to take other factors into account and "relay" or "surrogate" that request to another server. This additional server is called a "surrogate," and it will actually perform the recursion, therefore, allowing the resolving party to perform proper localization, optimization, or any other form of differentiated resolution. This surrogation also distributes the job of actually performing resolution, which adds scalability to the DNS server or service itself. A network of "surrogate" resolvers is possible as well as the concept of every client needing DNS resolution can also become a surrogate adding tremendous elasticity to the service.

The concept of surrogating DNS requests to a network of surrogates is unique and has not been accomplished before. A real need for DNS surrogation arises when building a cloud offering that is inherently reliant on DNS as a mechanism to provide service. Without surrogation, a DNS infrastructure must be built out in every region (city, country) that is serviced, which is a very costly endeavor. Surrogation allows for a DNS service to exist in a fewer number of sites while still providing results as if it in a greater number of sites while maintaining geographic localization. Surrogation also allows for a distributed method of providing DNS-based policy and resolution. If every client receiving service also is a surrogate, then the network scales elastically with every client. Surrogation also allows for a client to "fail open." If the cloud service is unavailable to provide a policy to the request, the client can fail open and still be operable.

DNS Surrogation Method

Figure 5:
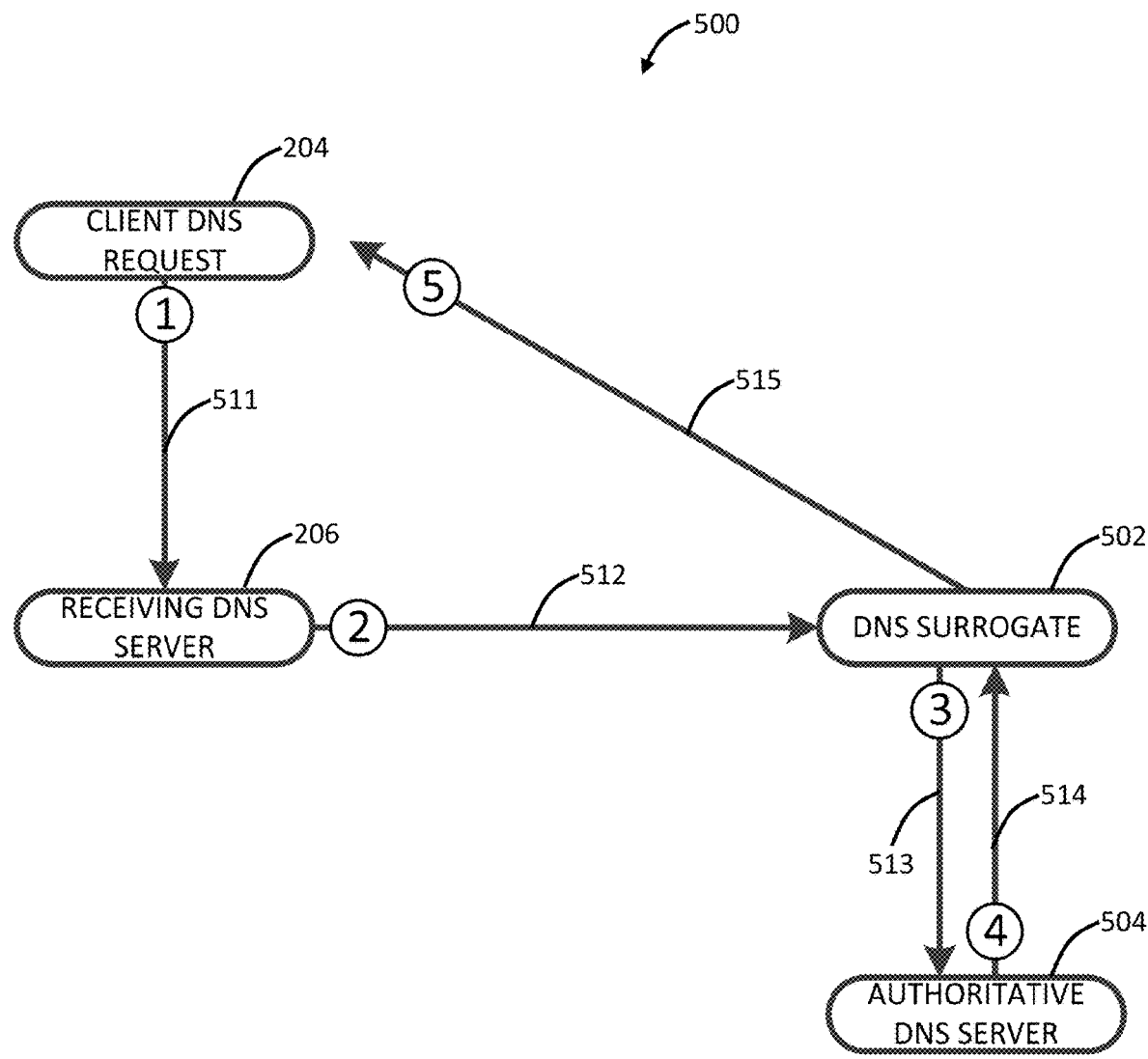
FIG. 5 is a network diagram of a DNS surrogation method.

Referring to FIG. 5, in an exemplary embodiment, a flow diagram illustrates a DNS surrogation method 500. The DNS surrogation method 500 operates between a client device 204, a DNS server 206, a DNS surrogate server 502, and an authoritative DNS server 504. For example, the DNS surrogation method 500 can be implemented by the cloud system 100, the network 200, or the like. The client device 204 can be any user equipment including, without limitation, an enterprise, the mobile device 400, a smart phone, a cell phone, a tablet, a net book, an ultrabook, a laptop, a desktop, or any digital computing device networked to the DNS server 206. The DNS server 206, the DNS surrogate server 502, and the authoritative DNS server 504 can include the server 300 or the like. Prior to operation of the DNS surrogation method 500 (or any DNS requests), the client device 204 is configured to use the DNS server 206 under associated network settings. For example, the client device 204 is configured with the IP address of the DNS server 206 as its DNS server (e.g., 8.34.34.34 and 8.35.35.35). In this manner, the DNS server 206 is configured as the recursive DNS server for the client device 204.

The DNS surrogation method 500 includes the client device 204 requests resolution of a particular domain name using the associated configured recursive DNS server 206 (step 511). The receiving DNS server 204 performs a policy lookup based on several factors including the client location, configuration policy, the status of the available surrogates, the locality of those surrogates, etc. For example, the policy lookup can be through policy data. If a decision to surrogate is made the request from the client device 204 is surrogated to a particular surrogate. For example, the receiving DNS server 206 provides the request from the client device 204 to the DNS surrogate server 502 (step 512). The DNS surrogate server 502 receives the request and performs recursion to get the requested resolution which includes sending a request to the authoritative DNS server 504 for the domain name which is being resolved (step 513). The authoritative DNS server 504 receives the request from the DNS surrogate server 502 allowing it to provide results based on the location/source IP address of the DNS surrogate server 502 as opposed to the receiving DNS server 206 (step 514). Finally, a localized/optimized/differentiated resolution (based on the DNS surrogate server 502) is provided directly back to the client device 204 (step 515). The DNS surrogation method 500 also allows for a lightweight DNS-based policy lookup occurring while leaving the actual process of resolution to take place on the DNS surrogate server 502. In this model, the DNS surrogate server 502 can actually be the client device 204 itself that is receiving DNS-based policy and control. The client surrogate could be a mobile phone, laptop, virtual machine, appliance, etc.

Figure 6:
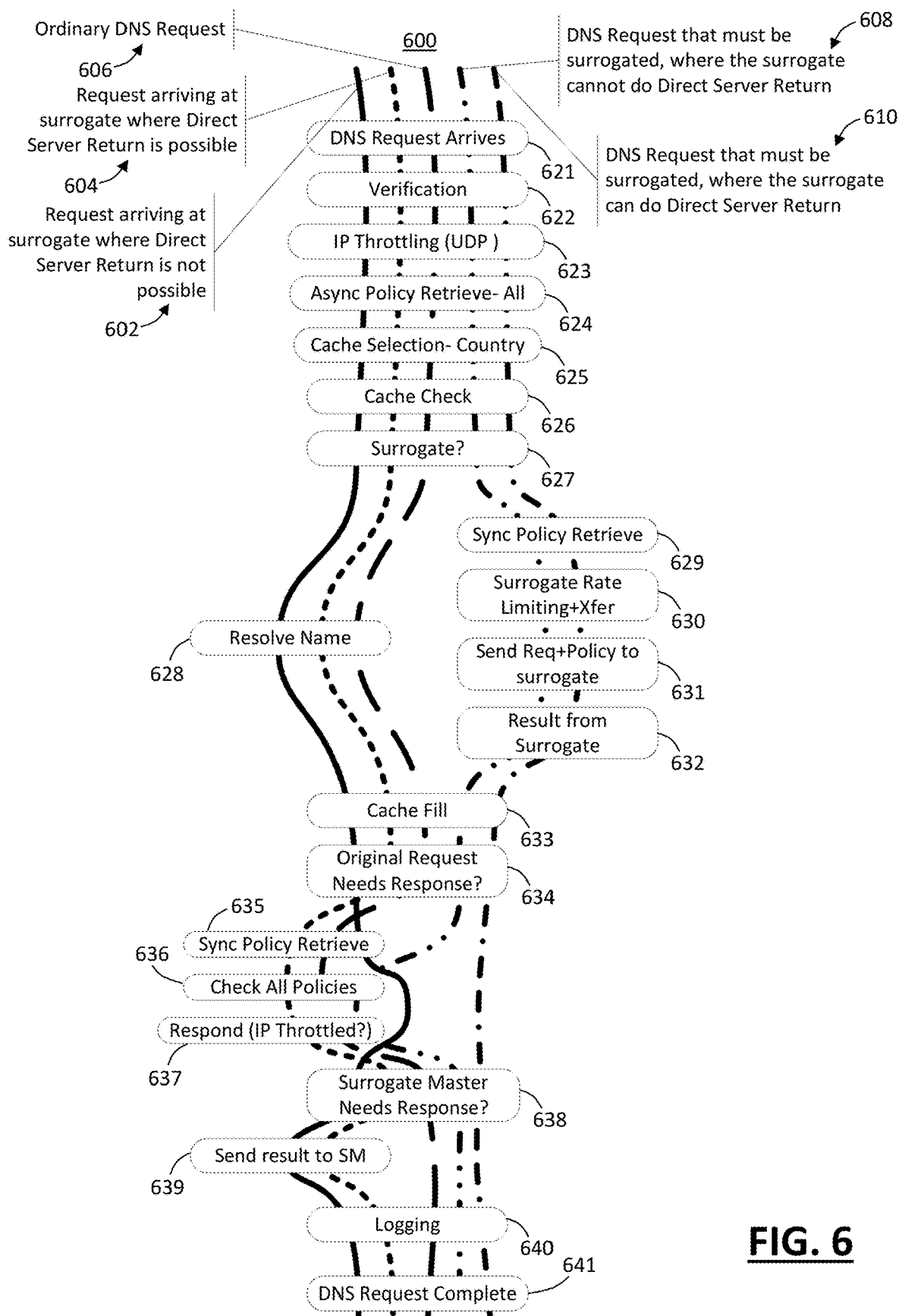
FIG. 6 is a flow diagram of a DNS surrogation method showing activity in the network of FIG. 5.

Referring to FIG. 6, in an exemplary embodiment, a flow diagram illustrates a DNS surrogation method 600 showing activity amongst the receiving DNS server 206 and the DNS surrogate server 502. The DNS surrogation method 600 can be implemented with the DNS surrogation method 500. The DNS surrogation method 600 includes five types of DNS requests 602, 604, 606, 608, 610. First, a DNS request 602 can arrive at the DNS surrogate server 502 where a direct server return is not possible. Second, a DNS request 604 can arrive at the DNS surrogate server 506 where a direct server return is possible. Third, a DNS request 606 can be an ordinary DNS request. Fourth, a DNS request 608 can arrive that must be surrogated where the DNS surrogate server 502 cannot do a direct server return. Fifth, a DNS request 610 can arrive that must be surrogated where the DNS surrogate server 502 can do a direct server return.

The DNS surrogation method 600 includes the DNS request 602, 604, 606, 608, 610 arriving (step 621) and verification is performed (step 622). Optionally, the DNS surrogation method 600 can perform IP throttling such as with UDP (step 623). The DNS surrogation method 600 can asynchronously retrieve policy for the DNS request 602, 604, 606, 608, 610 (step 624). For example, the policy can be contained in the policy data and can determine which type the DNS request 602, 604, 606, 608, 610. The DNS surrogation method 600 can select a cache based on geography (step 625) and check the selected cache (step 626). DNS cache servers store DNS query results for a period of time determined in the configuration (time-to-live) of the domain name record in question. All of the steps 621-627 can be performed for all of the different types of DNS request 602, 604, 606, 608, 610.

Next, the DNS surrogation method 600 determines if the type of DNS request 602, 604, 606, 608, 610 needs to be surrogated (step 627). The DNS requests 602, 604, 606 do not get surrogated, and the DNS requests 608, 610 do get surrogated. For the DNS requests 602, 604, 606, the DNS surrogation method 600 includes resolving the name of the DNS requests 602, 604, 606 (step 628). For the DNS requests 608, 610, the DNS surrogation method 600 performs a synchronous policy retrieval based on the DNS requests 608, 610 (step 629). Again, this can include the policy data. Here, the DNS surrogation method 600 can obtain information about which DNS surrogate server 502 to use, etc. With the policy retrieval, the DNS surrogation method 600 can perform rate limiting and transfer (step 630) and send the DNS request 608, 610 and the retrieved policy to the DNS surrogate server 502 (step 631). The DNS surrogation method 600 includes obtaining a result from the DNS surrogate server 502, the result being the DNS lookup of the DNS request 608, 610 (step 632).

Subsequent to steps 628, 632, the DNS surrogation method 600 can fill the cache (step 633). Next, the DNS surrogation method 600 determines if the DNS request 602, 604, 606, 608, 610 requires a response (step 634). The DNS requests 602, 604, 606, 608 require a response whereas the DNS request 610 does not. For the DNS requests 602, 604, 606, the DNS surrogation method 600 performs a synchronous policy retrieval (step 635). Subsequent to the step 635 and for the DNS requests 604, 606, 610, the DNS surrogation method 600 checks policies based on the policy retrieval (step 636) and responds based thereon (step 637). For example, a policy can include IP throttling. For all of the DNS request 602, 604, 606, 608, 610, the DNS surrogation method 600 determines if the DNS surrogate server 502 needs a response (step 638), and for the DNS requests 602, 604, the DNS surrogation method 600 sends the result to the DNS surrogate server 502. Finally, the DNS surrogation method 600 performs logging (step 640) and the DNS requests are complete (step 641).

User-Level Identification in DNS

Figure 7:
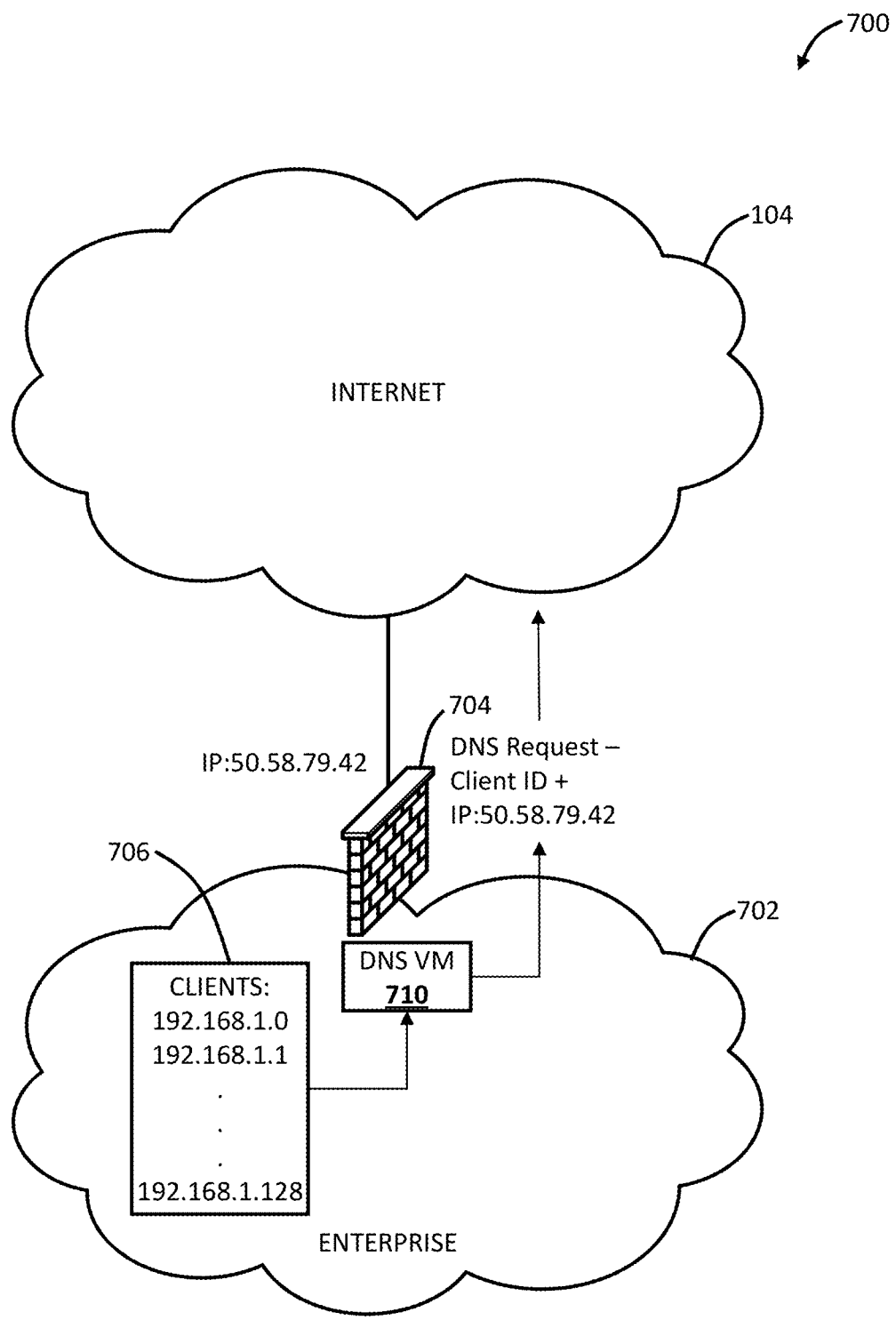
FIG. 7 is a network diagram of a network to describe user-level identification in DNS requests from an enterprise.

Referring to FIG. 7, in an exemplary embodiment, a network diagram illustrates a network 700 to describe user-level identification in DNS requests from an enterprise 702. The enterprise 702 includes a local area network demarcated by a firewall device 704 or the like, and to the Internet 104 appears as a single IP address, e.g., 50.58.79.42. The enterprise 702 can include a plurality of clients 706 which each have local IP addresses within the local area network, e.g., 192.168.1.X, etc. Conventionally, all DNS requests from the enterprise 702 appear to originate from the same IP address, 50.58.79.42. That is, DNS loses per user identification through the NAT process. Thus, conventionally there is no visibility or granularity at an individual user level in DNS with NAT. The network 700 describes an exemplary technique to maintain per user granularity with DNS despite the NAT for DNS requests sent beyond the firewall device 704 to the Internet. With this granularity, DNS can be leveraged to provide cloud-based user-level policy, reporting, and authentication systems and methods.

To specify each user to each DNS transaction such as for user-level differentiated policy and reporting with seamless/transparent authentication using a DNS-based system, the network 700 includes a DNS virtual machine (VM) 710 or the like. The DNS VM 710 can be a stand-alone device in the enterprise 702 or embedded into other devices in the enterprise 702 such as switches, routers, firewalls, access devices, etc. The DNS VM 710 is located behind the firewall 704 or NAT boundary within the enterprise 702, and the DNS VM 710 has visibility to internal addresses of the enterprise 702. Within the enterprise 702, the clients 702 can set their DNS to the DNS VM 710 which as a transparent proxy providing DNS requests to the Internet 104, i.e., the cloud, with per user granularity. That is, the DNS VM 710 can encapsulate data in a received DNS request from one of the clients 706 and forward the DNS request with the encapsulated data to the cloud. For example, the DNS request would include the standard DNS request format which shows the source IP as 50.58.79.42, but the DNS request is encapsulated with additional data such as the client ID. The encapsulated data can include user identification metadata, a device ID, protocol, etc. For example, the DNS VM 710 can use Tunnel Type of Service (ToS). The DNS VM 710 can also include a surrogation table which determines where to send each received DNS request.

Figure 8:
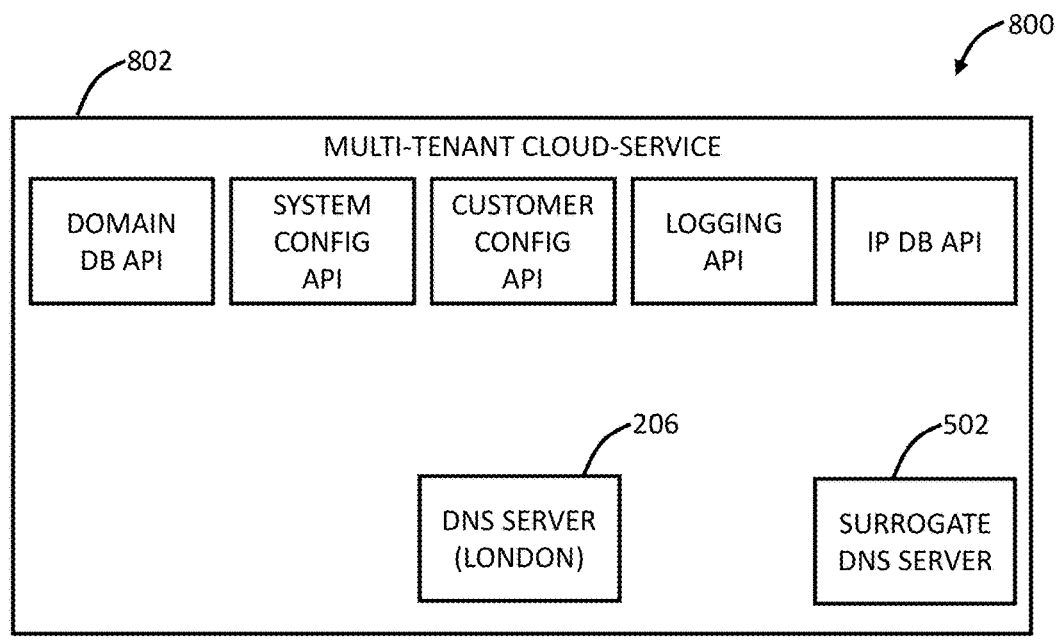
FIG. 8 is a network diagram of a network showing the enterprise from FIG. 7 with the DNS VM connected to the DNS server and a multi-tenant cloud service.
Figure 8:
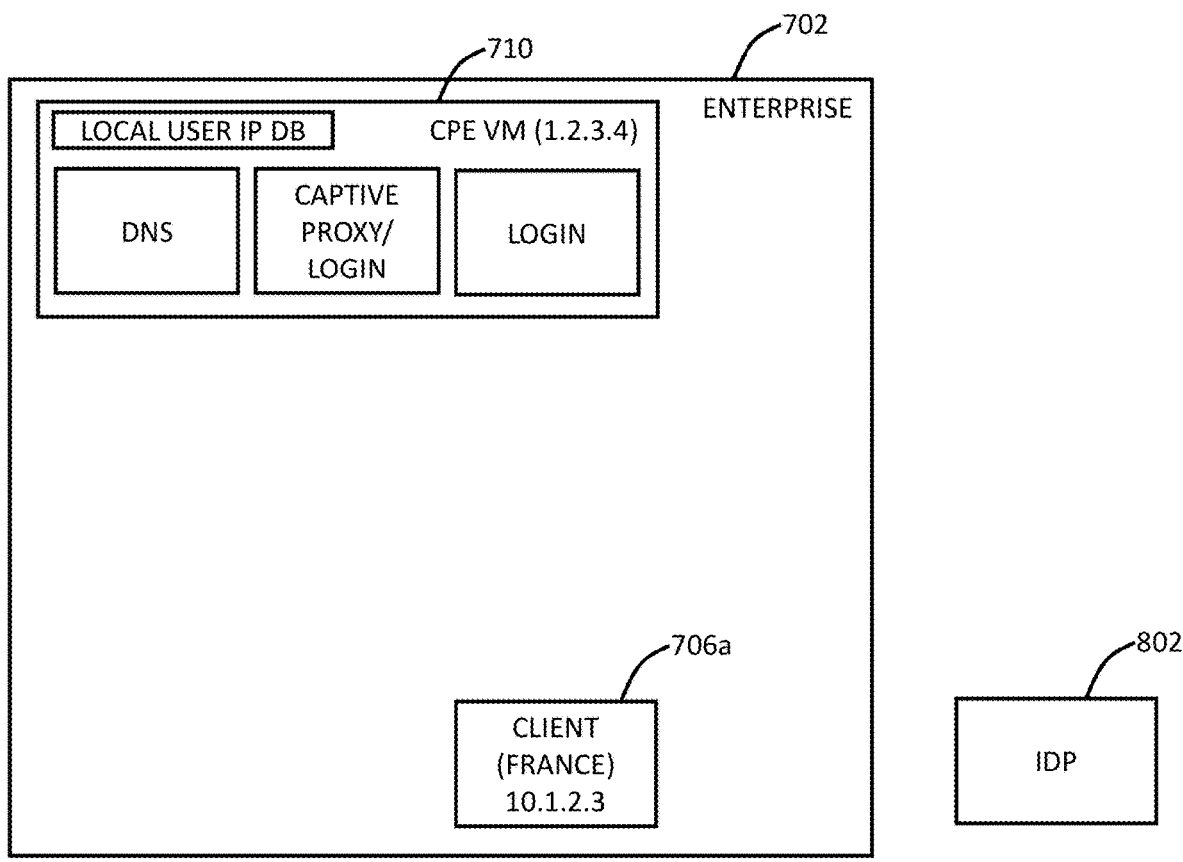

Cloud-Based System with User-Level Policy, Reporting, and Authentication over DNS Referring to FIG. 8, in an exemplary embodiment, a network diagram illustrates a network 800 showing the enterprise 702 with the DNS VM 710 connected to the DNS server 206 and a multi-tenant cloud service 802. The multi-tenant cloud service 802 is implemented in the cloud such as the distributed security cloud 202 and is shown here as software functionality, via APIs. Specifically, the multi-tenant cloud service 802 utilizes DNS to perform user-level differentiated policy and reporting with seamless/transparent authentication. The multi-tenant cloud service 802 includes domain databases, configuration and policy (both system and customer), logging, and forward and reverse proxies. The DNS VM 710 is operated on the internal network of the enterprise 702 behind the firewall NAT boundary and includes DNS, a captive proxy/login, a login, and a local user IP database. The network 800 can also include an Identity Provider (IDP) 804 for transparent user-level authentication a service that can integrate to an existing authentication store (e.g., Security Assertion Markup Language (SAML)). For localization/performance optimization, the network 800 can include the surrogate DNS server 206 to relay queries to. Also, the network 800 can include a captive proxy internal and a captive proxy external to the enterprise 702. In operation, the network 800 includes a series of redirecting and handing off between the components that in the end achieve user-level policy and filtering, authentication, attribution, and reporting of their Internet-bound traffic.

Figure 9:
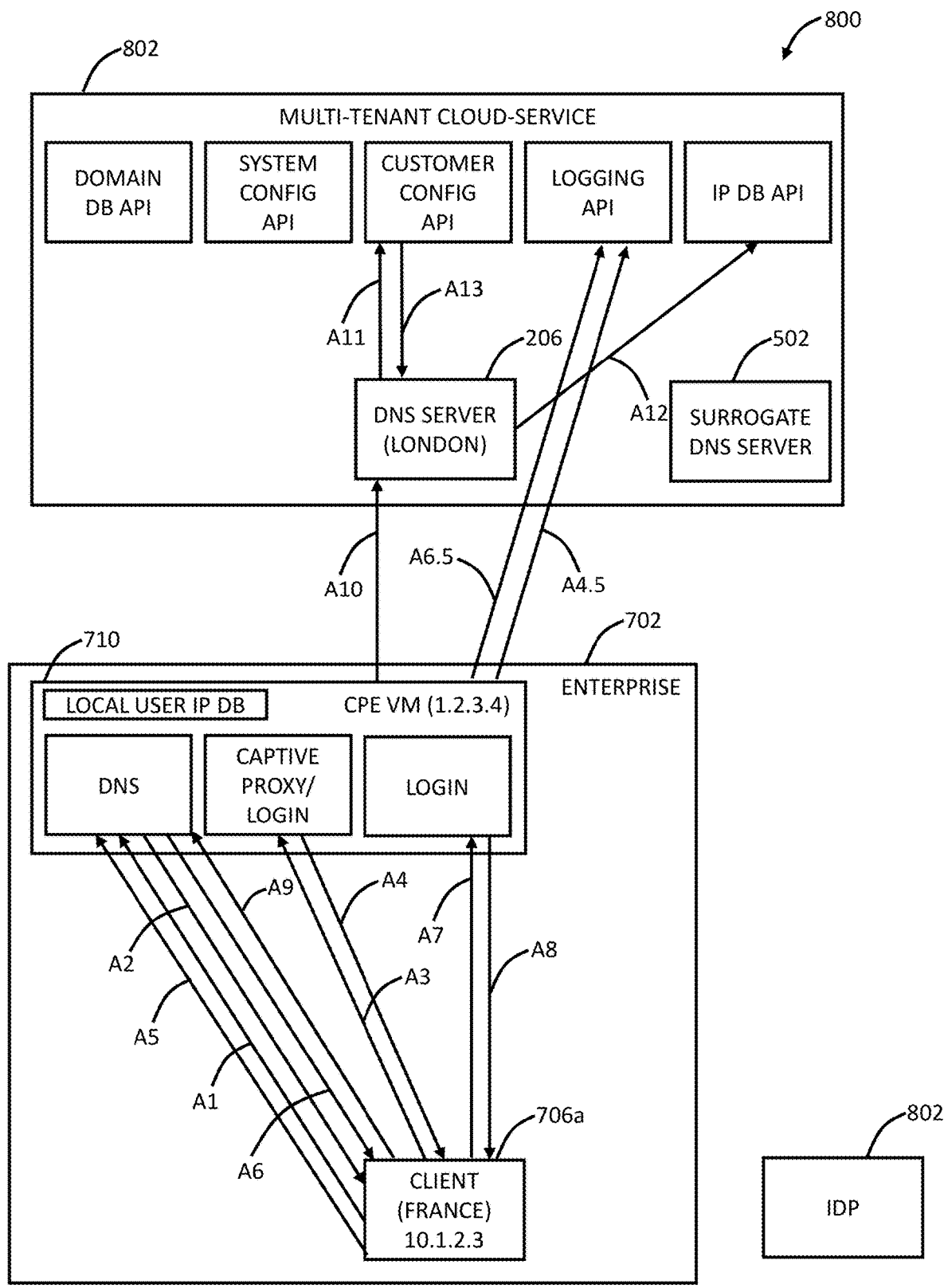
FIGS. 9-11 are network diagrams of the network of FIG. 8 showing an exemplary operation from a client with the multi-tenant cloud service.
Figure 10:
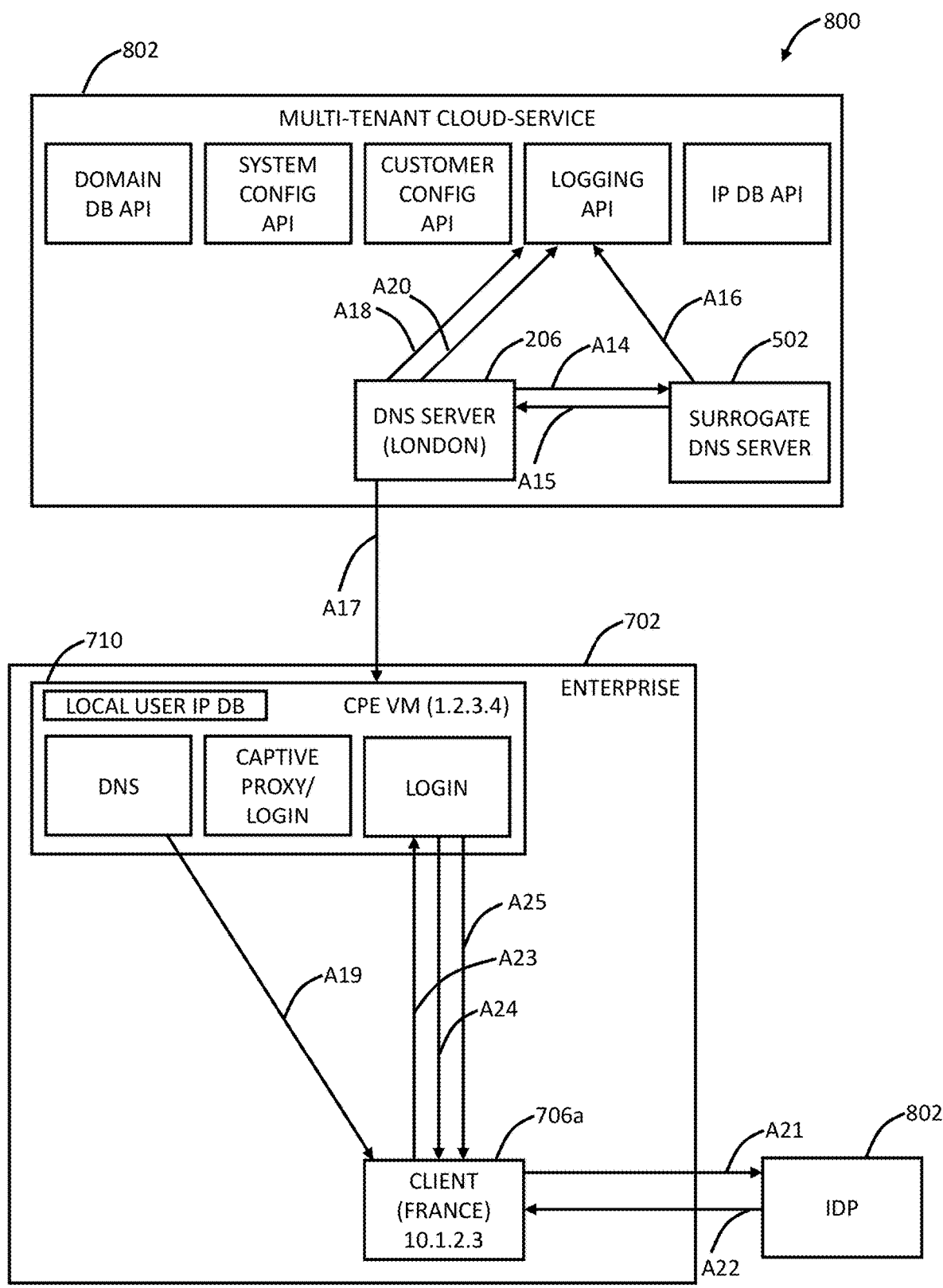
Figure 11:
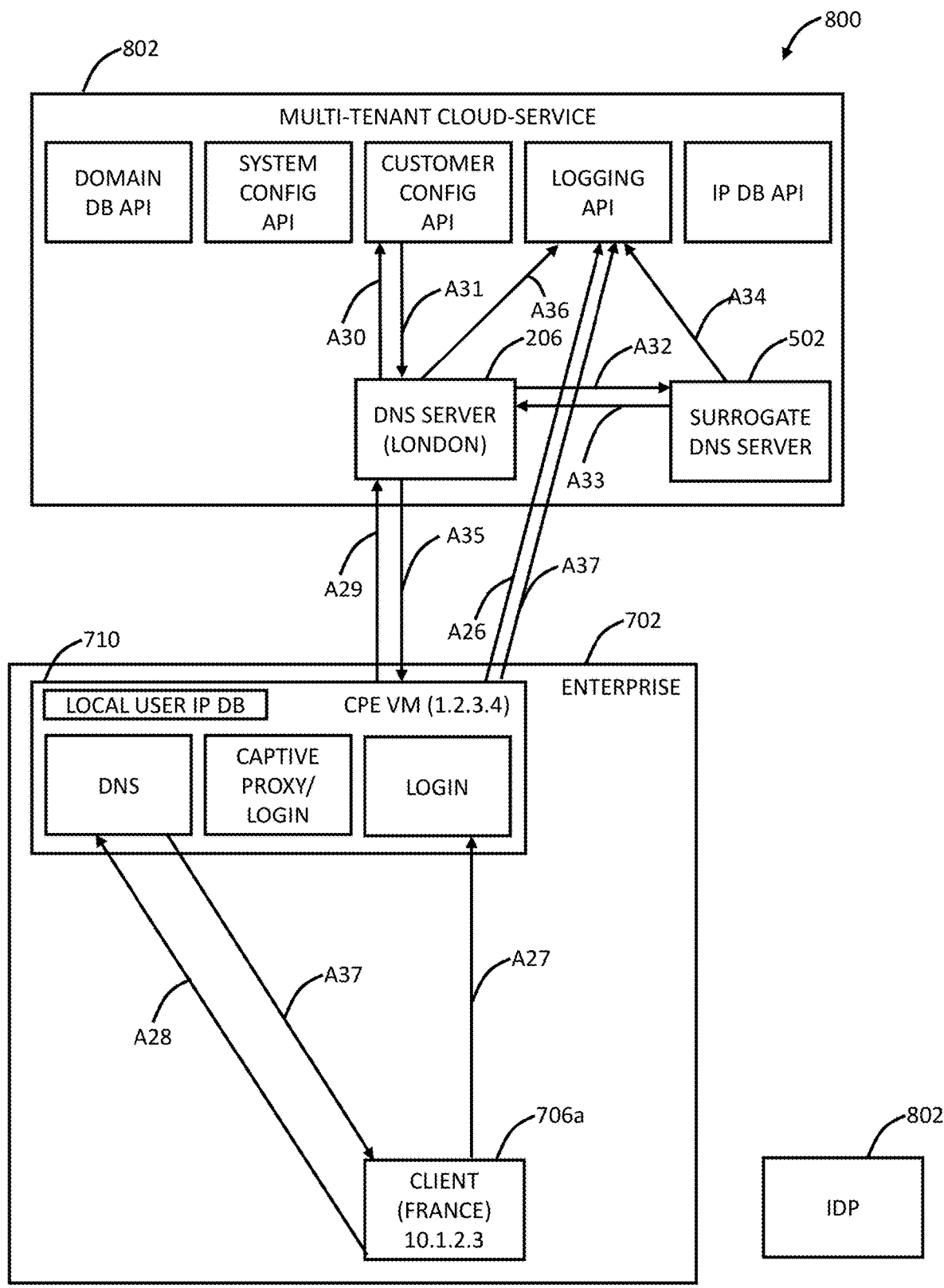

Referring to FIGS. 9-11, in an exemplary embodiment, network diagrams of the network 800 show an exemplary operation from a client 706*a* (IP=10.1.2.3). Note, for example, the client 706*a* is located in France, and the DNS server 206 is located in London. The exemplary operation begins when the client 706*a* in the enterprise 702 (i.e., on the internal network) sends a DNS lookup for "cnn.com" (step A1). Note, the client 706*a* has its DNS set to the DNS VM 710 (IP=1.2.3.4), and the DNS lookup request for "cnn.com" is set to the DNS component of the DNS VM 710. At the DNS VM 710, there is no user entry in the local user IP database for the client 706*a*, so the DNS VM 710 will respond to the client 706*a* with a proxy IP which will relay this IP address through the multi-tenant cloud service 802 (step A2). Next, the client 706*a* will get cnn.com through the captive proxy/login of the DNS VM 710 (step A3).

The DNS VM 710 will redirect to the proxy, e.g., proxy.z-path.com (step A4). The DNS VM 710 can log this redirect (step A4.5). The client 706*a* will send a lookup for proxy.z-path.com (step A5), and the DNS VM 710 will respond with the proxy IP of proxy.zpath.com (step A6). The DNS VM 710 can log this proxy IP of proxy.zpath.com (step A6.5). The client will get proxy.zpath.com/<encoded> (step A7). The DNS VM 710 will perform SAML authentication and redirect to the IDP (step A8). The client 706*a* sends a look up for the IDP where DNS lookup for the IDP must bypass the captive proxy (step A9) thus the look up is sent to the DNS server 206 (step A10). The DNS server 206 gets a configuration for the enterprise 702 ("company.com") (step A11) and registers the IP address of the enterprise 702, i.e., 1.2.3.4, as belonging to company.com (step A12). The multi-tenant cloud service 802 provides company.com's configuration in response to the DNS server 206 (step A13).

Continuing in FIG. 10, the DNS server 206 sends a request to the surrogate DNS server 502 to perform a look up of the IDP (step A14). The surrogate DNS server 502 responds with the look up—IDP @ idp.com (step A15). The surrogate DNS server 502 logs, for company.com, its lookup for IDS as a surrogate (step A16). The DNS server 206 provides IDP @ idp.com to the DNS VM 710 (step A17), and logs for 1.2.3.4, company.com, looking up IDP as a surrogate (step A18). The client 706*a* is told that IDP is @ idp.com (step A19). The DNS server 206 can log IDP @ idp.com (step A20). The client 706*a* sends a SAML redirect AUTH request to the IDP 802 (step A21) which responds with an SAML redirect AUTH response (step A22). The client device 706*a* sends the SAML redirect AUTH response to the DNS VM 710 (step A23) which redirects the client 706*a* to itself to install a cookie (step A24), and the client is now self-redirect with a cookie (step A25).

Continuing in FIG. 11, the DNS VM 710 sends a log to the multi-tenant cloud service 802 to log user@company.com @ 10.1.2.3 via idp.com (step A26). The client 706*a* redirects back to cnn.com (step A27) and requests a look up of cnn.com (step A28). The DNS VM 710 relays the look up to the DNS server 206 with user@company.com (step A29). The multi-tenant cloud service 802 gets user@company.com's configuration (step A30), and the DNS server 206 receives user@company.com's configuration (step A31). The DNS server 206 has the surrogate DNS server 502 looks up cnn.com (step A32). For example, the surrogate DNS server 502 can be in Paris (as the client 706*a* is in France). The surrogate DNS server 502 returns cnn.com as cnn.co.fr (e.g., with IP address) (step A33) and the surrogate DNS server 502 logs the transaction (step A34). The DNS server 206 returns cnn.com as cnn.co.fr (e.g., with IP address) (step A35), and logs the transaction (step A36). The client 706*a* is provided cnn.com as cnn.co.fr (e.g., with IP address) (step A37) and the DNS VM 710 logs this transaction (step A38).

Note, the customer configuration steps can be used to proactively manage policy. For example, if the user 706*a* was requesting the DNS for forbiddendomain.com, the multi-tenant cloud service 802 could prevent such access. In this manner, DNS is leveraged to provide a lightweight cloud monitoring technique. Note, such systems and methods do not require large hardware infrastructure for in-line monitoring of all requests nor do they require hardware in the enterprise 702 (e.g., the DNS VM 710 can be Customer Premises Equipment (CPE) or software included in existing hardware in the enterprise 702, e.g. on switches, routers, firewalls, etc.). The opportunity here is to provide the content filtering at the DNS request stage and either allow or disallow. All activity is logged, and companies can set different configuration policies for different users, etc.

Doman Name Server (DNS) Surrogation

In an exemplary embodiment, a Doman Name Server (DNS) surrogation method includes receiving a DNS request at a DNS server; performing a policy look up based on a plurality of factors related to the DNS request; surrogating the DNS request to one of a plurality of surrogates based on the policy look up; performing DNS resolution of the DNS request by the one of the plurality of surrogates; and providing a result of the DNS resolution in response to the DNS request. The DNS surrogation method can further include configuring a user device to use the DNS server for DNS resolution; and performing the DNS resolution for the user device by the one of the plurality of surrogates. The DNS surrogation method can further include determining surrogation is required for the DNS request based on the policy look up. The DNS surrogation method can further include performing the policy look up to determine a location of a user device associated with the DNS request, configuration policy, status of the plurality of surrogates, and locality of the plurality of surrogates. The DNS surrogation method can further include providing a request from the one of the plurality of surrogates to an authoritative DNS server associated with a domain name of the DNS request. The DNS surrogation method can further include receiving the result of the DNS resolution based on a location or source Internet Protocol address of the one of the plurality of surrogates instead of based on the DNS server. The one of the plurality of surrogates can include a user device associated with the DNS request. The plurality of surrogates can be geographically diverse and communicatively coupled to the DNS server thereby forming a distributed security cloud network.

In another exemplary embodiment, a Doman Name Server (DNS) system includes a Doman Name Server (DNS) communicatively coupled to a user device; a policy data store communicatively coupled to the DNS; and a surrogate DNS communicatively coupled to the DNS; wherein the DNS is configured to: receive a DNS request from the user device; perform a policy look up based on a plurality of factors related to the DNS request; and transmit the DNS request to the surrogate DNS based on the policy look up; and wherein the surrogate DNS is configured to: perform DNS resolution of the DNS request; and provide a result of the DNS resolution to the user device. The user device can be configured to use the DNS for DNS resolution, and wherein the DNS resolution is performed by the DNS surrogate. The DNS can determine surrogation is required for the DNS request based on the policy look up. The policy look up can determine a location of the user device associated with the DNS request, configuration policy, status of a plurality of surrogates including the surrogate DNS, and locality of the plurality of surrogates. The surrogate DNS can be configured to provide a request to an authoritative DNS server associated with a domain name of the DNS request. The result of the DNS resolution can be based on a location or source Internet Protocol address of the surrogate DNS instead of based on the DNS. The surrogate DNS can include the user device associated with the DNS request. A plurality of surrogates including the surrogate DNS can be geographically diverse and communicatively coupled to the DNS thereby forming a distributed security cloud network.

In yet another exemplary embodiment, a Doman Name Server (DNS) include a network interface; a processor communicatively coupled to the network interface; memory storing instructions that, when executed, cause the processor to: receive a DNS request from a user device through the network interface, wherein the user device is configured with an Internet Protocol address of the DNS for providing DNS resolution; perform a policy look up based on a plurality of factors related to the DNS request; and surrogate the DNS request to one of a plurality of surrogates based on the policy look up, wherein the one of the plurality of surrogates performs the DNS resolution instead of the DNS. The policy look up can determine a location of the user device, configuration policy, status of the plurality of surrogates, and locality of the plurality of surrogates such that the one of the plurality of surrogates is chosen based thereon. The one of the plurality of surrogates can include the user device associated with the DNS request. The plurality of surrogates can be geographically diverse and communicatively coupled to the DNS thereby forming a distributed security cloud network.

In an exemplary embodiment, a cloud-based method for user-level policy, reporting, and authentication over Domain Name System (DNS) includes maintaining a local user Internet Protocol (IP) database identifying users in an enterprise; acting as a transparent proxy for all DNS requests from the users performing the steps of: for a user already identified in the local user IP database, forwarding a DNS request to a cloud-based system with an identifier from the local user IP database of the user associated with the DNS request; and for the user not identified in the local user IP database, performing a series of redirects and hand offs between the cloud-based system, the enterprise, the user and an Identity Provider (IDP) to uniquely identify the user, wherein the series of redirects and hand offs is between i) the user and the enterprise, ii) the enterprise and the cloud-based system, iii) the cloud-based system within itself, iv) the user and the IDP directly, and v) the user to itself to install a cookie; subsequent to the performing the series of redirects and hand offs in the cloud-based system to identify the user, updating an identity of the user in the local user IP database; forwarding a second DNS request to the cloud-based system with the identifier from the local user IP database of the user associated with the second DNS request; performing, based on associated DNS requests and the local user IP database, user-level policy, reporting, and authentication by the cloud-based system responsive to uniquely identifying the users, wherein the performing includes determining if one of the associated DNS requests is within policy of the enterprise for an associated user and returning a resolved address for the one of the associated DNS requests if it is within the policy.

The cloud-based method can further include forwarding the DNS request to the cloud-based system with the identifier encapsulated therein, wherein the enterprise utilizes Network Address Translation, and the IP address for the DNS request includes an enterprise IP address shared by all of the users in the enterprise with the identifier uniquely identifying the user. The cloud-based system can include a multi-tenant cloud system providing differentiated user-level content and security filtering policies via DNS. The cloud-based method can further include receiving a DNS response from the multi-tenant cloud system, wherein the DNS response is per content and security filtering policies of the enterprise and for the user. The cloud-based method can further include performing the maintaining and the acting via a Virtual Machine located with a network of the enterprise, wherein the maintaining and acting are provided without additional hardware added in the enterprise network. The cloud-based method can further include performing the maintaining and the acting via a Virtual Machine located on a network device within a network of the enterprise, wherein the maintaining and acting are provided without additional hardware added in the enterprise network. The cloud-based method can further include performing the maintaining and the acting behind a Network Address Translation boundary in the enterprise. The cloud-based method can further include performing logging of each transaction with the cloud-based system. The cloud-based method can further include forwarding the DNS request to a DNS server in the cloud-based system with the identifier; and using DNS surrogation to resolve the DNS request if the DNS request is within the policy of the enterprise for the user.

In another exemplary embodiment, a cloud-based system for user-level policy, reporting, and authentication over Domain Name System (DNS) includes a cloud service-provided virtual machine (VM) operated on an internal network behind a Network Address Translation boundary; and a multi-tenant cloud-service operated on a cloud-based system communicatively coupled to the VM; wherein the VM is configured to: maintain a local user Internet Protocol (IP) database identifying users in the internal network; and act as a transparent proxy for all DNS requests from the users performing the steps of: for a user already identified in the local user IP database, forwarding a DNS request to the multi-tenant cloud-service with an identifier from the local user IP database of the user associated with the DNS request; and for the user not identified in the local user IP database, performing a series of redirects and hand offs between the cloud-based system, the enterprise, the user and an Identity Provider (IDP) to uniquely identify the user, wherein the series of redirects and hand offs is between i) the user and the enterprise, ii) the enterprise and the cloud-based system, iii) the cloud-based system within itself, iv) the user and the IDP directly, and v) the user to itself to install a cookie; subsequent to the performing the series of redirects and hand offs in the cloud-based system to identify the user, updating an identity of the user in the local user IP database; and forwarding a second DNS request to the cloud-based system with the identifier from the local user IP database of the user associated with the second DNS request; wherein the multi-tenant cloud-service is configured to perform, based on associated DNS requests and the local user IP database, user-level policy, reporting, and authentication by the cloud-based system responsive to uniquely identifying the users, and wherein the multi-tenant cloud-service is configured to determine if one of the associated DNS requests is within policy of the internal network for the user, and return a resolved address from the one of the associated DNS requests if it is within the policy.

In a further exemplary embodiment, a transparent proxy operating in a device within an enterprise network includes a device in the enterprise network includes a processor and memory storing instructions that, when executed, cause the processor to: maintain a local user Internet Protocol (IP) database identifying users in the enterprise network; receive a DNS request from a user; if the user is already identified in the local user IP database, forward the DNS request to a multi-tenant cloud-service with an identifier from the local user IP database of the user associated with the DNS request; if the user is not identified in the local user IP database, perform a series of redirects and hand offs between the cloud-based system, the enterprise, the user and an Identity Provider (IDP) to uniquely identify the user, wherein the series of redirects and hand offs is between i) the user and the enterprise, ii) the enterprise and the cloud-based system, iii) the cloud-based system within itself, iv) the user and the IDP directly, and v) the user to itself to install a cookie; subsequent to the performance of the series of redirects and hand offs in the cloud-based system to identify the user, update an identity of the user in the local user IP database; and forward a second DNS request to the cloud-based system with the identifier from the local user IP database of the user associated with the second DNS request; wherein the multi-tenant cloud-service is configured to perform, based on associated DNS requests and the local user IP database, user-level policy, reporting, and authentication by the cloud-based system responsive to uniquely identifying the user, and wherein the multi-tenant cloud-service is configured to determine if one of the associated DNS requests is within policy of the internal network for the user, and return a resolved address from the one of the associated DNS requests if it is within the policy.

Intelligent Routing Using DNS for Cloud Security

Figure 12:
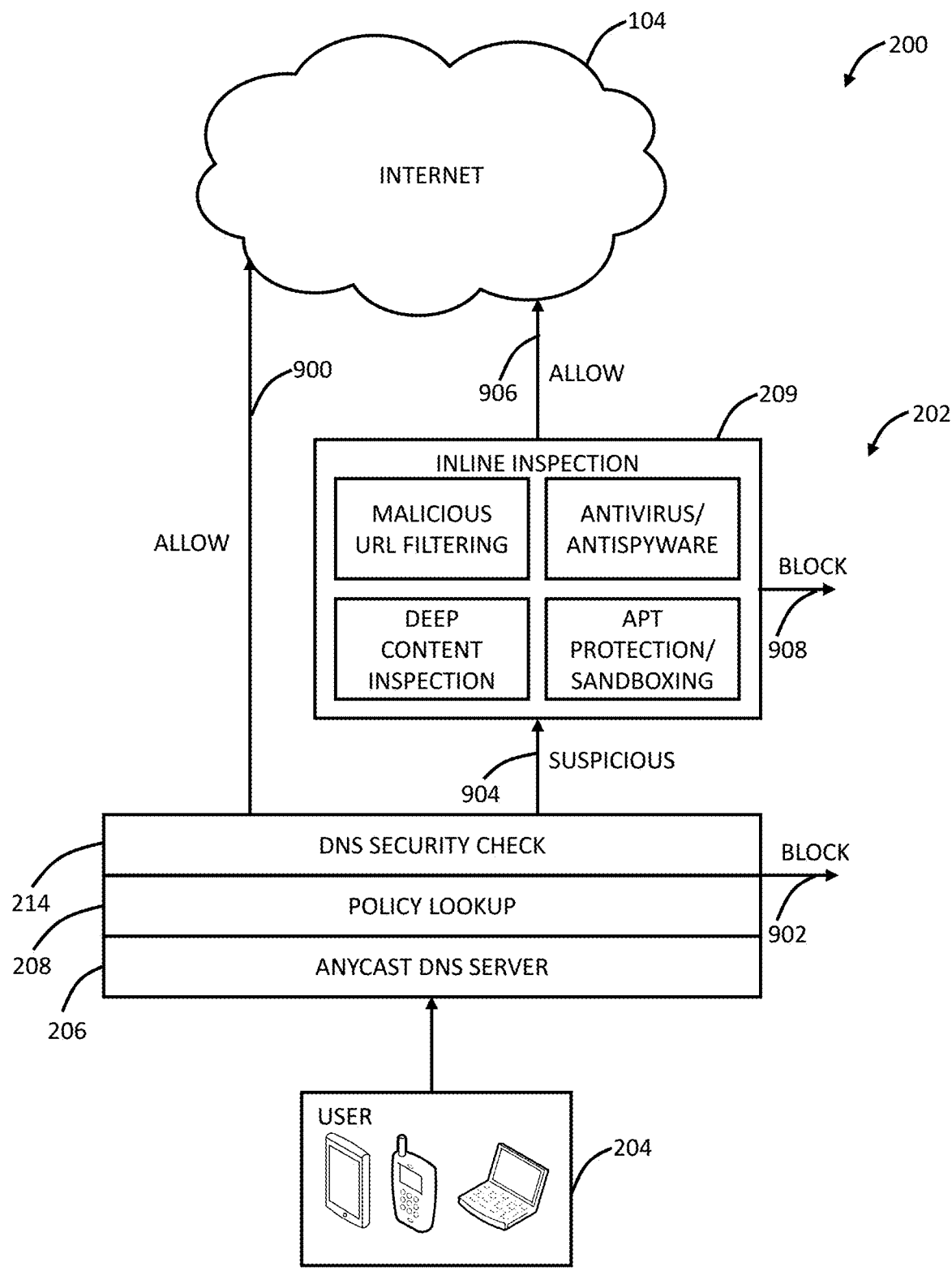
FIG. 12 is a network diagram illustrating additional details of the network of FIG. 2 with the distributed security cloud providing DNS augmented security.

Referring to FIG. 12, in an exemplary embodiment, a network diagram illustrates additional details of the network 200 of FIG. 2 with the distributed security cloud 202 providing DNS augmented security. The distributed security cloud 202 can be viewed as an intelligent routing platform which connects to various external security feeds, provides cloud sandboxing, advanced security intelligence, etc. The key to the distributed security cloud 202 is transactions are monitored based on DNS, and in-line monitoring is only required when the user's security policy (or a policy from an enterprise associated with the user) requires inline functionality. In this manner, the distributed security cloud 202 is a lightweight platform, providing inline functionality on an as-needed basis.

The users can include any user device 204, such as laptops, mobile devices, computers, tablets, set top boxes, IoT devices, or any Internet-enabled device. As described herein, DNS is practically universally supported by Internet devices which make DNS ideal for the intelligent routing platform. The setup for the user device 204 includes re-directing traffic to the distributed security cloud 202 using the anycast DNS server 206. The anycast DNS server 206 can use the various approaches described herein. The distributed security cloud 202 can include anycast DNS servers 206 geographically distributed in data centers, etc. The user device 204 can be automatically directed to the nearest anycast DNS server 206 to deliver the highest performance. The user devices 204 can be uniquely identified using the various techniques described herein, e.g., using a series of redirects and handoffs as required.

The distributed security cloud 202 can include a physical architecture of the cloud system 100 and functionally includes the anycast DNS server 206, the policy data 208, the inline inspection 209, and the DNS security check 214. The anycast DNS server 206 is configured to return an IP address of a site based on a request from the user device 204, based on a policy of the user associated with the user device 204 looked up in the policy data 206. The policy can specify whether the request goes directly to the Internet 104 or whether the request goes through the inline inspection 209, based on the DNS security check 214. The inline inspection 209 can include malicious URL filtering, antivirus/antispyware detection, deep content inspection, APT protection/sandboxing, Data Loss Prevention (DLP), etc.

Specifically, a request from the user device 204 to the anycast DNS server 206 can be allowed where the anycast DNS server 206 returns the IP address for the request allowing the user device to directly go to the Internet 104 (step 900). Alternatively, the request can be blocked at the DNS security check 214 based on the policy data 208 (step 902). For example, the blocking at step 902 can be based on policy pertaining to the request at the DNS level (e.g., gambling site, adult content, etc.). Alternatively, the request can be provided to the inline inspection 209 (step 904) such as based on a determination of suspicious content by the DNS security check 214. The inline inspection 209 can either allow the request (step 906) if the request passes the various security checks or block the request (step 908) if there is a failed security check.

Policy in the Distributed Security Cloud Using DNS

The policy can include:

A strict content filter to traffic from the user device 204: All adult content and legal liability sites, including sites related to gambling, drugs, profanity, and violence, are blocked.

Threat Security enabled: If the user device 204 user requests a suspicious site, or a domain known to contain malicious content, the DNS security check 214 sends the traffic through the distributed security cloud 202 for full inspection via the inline inspection 209. The distributed security cloud 202 provides protection against basic spyware and malware (including botnets, malicious active content, unauthorized communications, and cross-site scripting) as well as standard Behavioral Analysis (e.g., for all Windows executable files and Dynamic Link Libraries of traffic from URLs in suspicious URL categories).

Safe Search enabled: This browser function blocks inappropriate or explicit images from search engine results for the user device 204. Enabling Safe Search in the policy forces all end users' web browsers to use Safe Search, and users cannot bypass the restriction.

The distributed security cloud 202 offers multiple layers of security for an organization, including content filtering, threat security, Safe Search, and Secure Sockets Layer (SSL) inspection. In an admin portal, an administrator can configure policies and specify how to implement these security features for users in an organization. Furthermore, the administrator can either configure a single policy for a location or can configure up to multiple policies (e.g., four) for each location in the organization, so that different policies can be enforced for different groups of users at the location.

Figure 13:
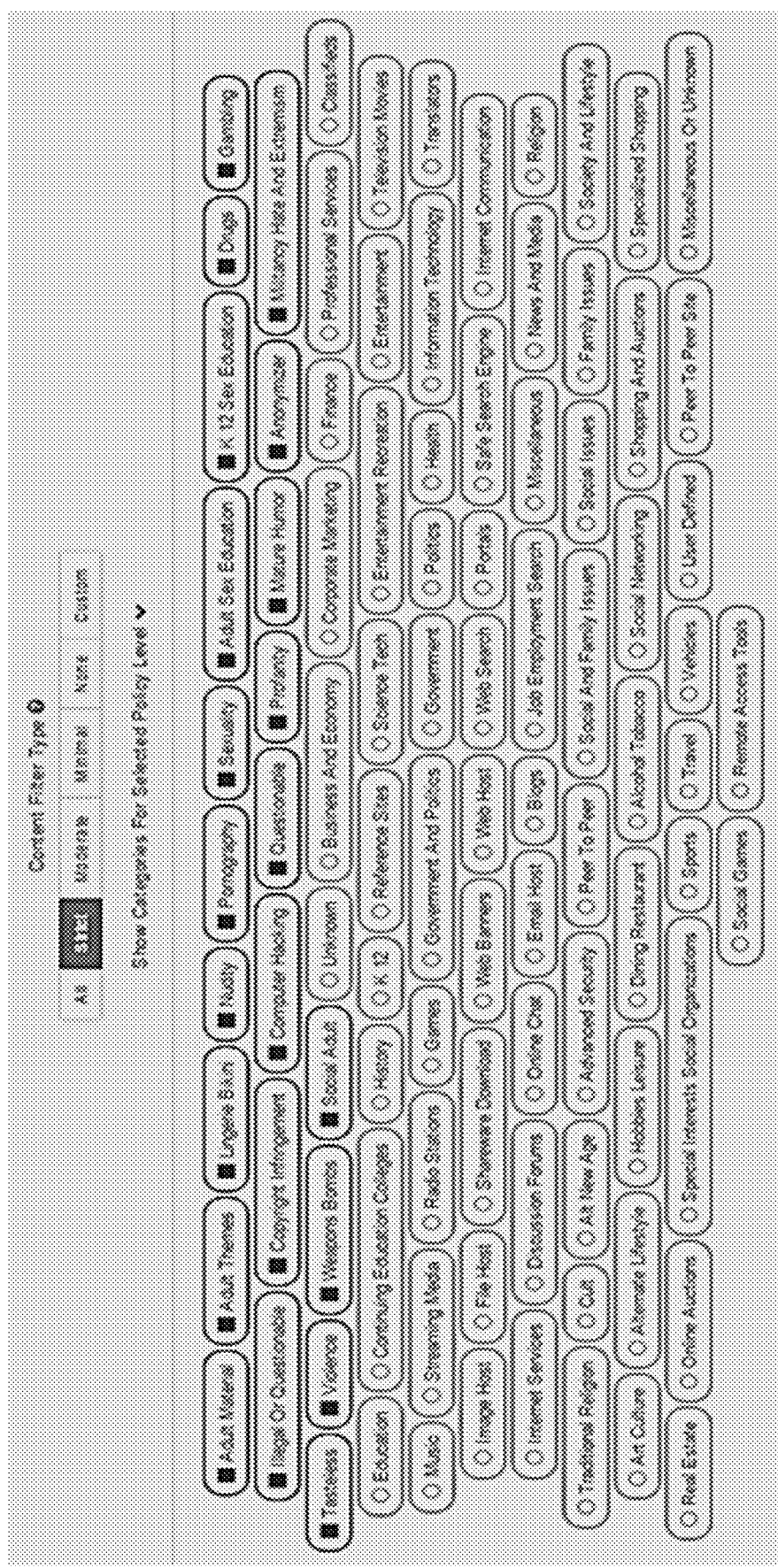
FIG. 13 is a screen shot of various categories for a DNS security check.

The policies are administrator configurable for content filtering, threat security, Safe Search, SSL inspection, and whitelisting/blacklisting of URLs. For content filtering, the policies allow the level of content filtering is enforced for an organization's users by the DNS security check 214. In an exemplary embodiment, the administrator can select from the six content filter types below when configuring a policy. Each filter type corresponds to a predefined group of URL categories that the DNS security check 214 can block, namely—All, Strict, Moderate, Minimal, None, and Custom. FIG. 13 is a screen shot of various categories for the DNS security check 214, set for the Strict category.

For threat security, if the user device 204 requests a URL that is unknown to the DNS security check 214 or deemed suspicious according to a threat scoring mechanism, the distributed security cloud 202 can forward the traffic to the inline inspection 209 to perform full in-line inspection of content from these domains and provide the following advanced security features:

Protection against basic spyware and malware as well as other advanced threats, including botnets, malicious active content, unauthorized communications, and cross-site scripting; and When necessary, integrated file sandboxing analysis (running and analyzing files in a virtual environment to detect hidden malicious content) for all Windows executable files and Dynamic Link Libraries (DLL) of traffic from URLs in suspicious categories.

This feature is enabled by default, but the administrator can choose to disable it in the policies.

For Safe Search, the distributed security cloud 202 can ensure the user device's 204 browsers block all inappropriate or explicit images from search engine results. Users cannot bypass this restriction on their browsers. This feature is enabled by default, but the administrator can choose to disable it in your policies.

For SSL Inspection, the distributed security cloud 202 can perform HTTPS decryption on any HTTPS site it deems suspicious according to a threat scoring mechanism, with the exception of sites in the Healthcare, Finance, and Banking URL categories. To protect the users' privacy, the distributed security cloud 202 does not inspect content in those three categories.

For Whitelisting and Blacklisting URLs, no matter what content filter type is chosen or which of the above security features are enabled for a given policy, there may be some domains that it is desired to whitelist and always allow for users and other domains that are desired to blacklist and always block for users.

Figure 14:
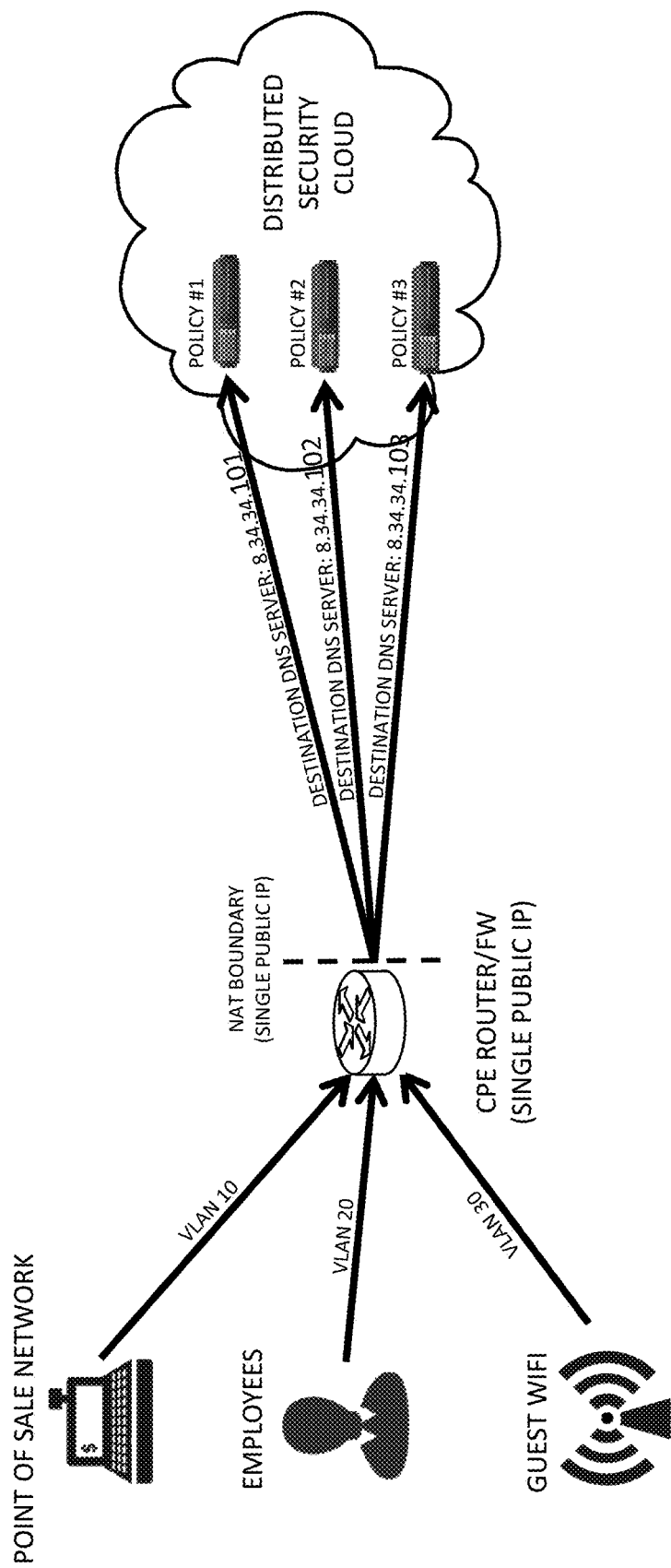
FIG. 14 is a networking diagram of the DNS augmented security supporting multiple policies per location.

FIG. 14 is a networking diagram of the DNS augmented security supporting multiple policies per location. For example, an administrator may create up to four different policies for a given location and apply them to different groups of users at the location. For example, assume the administrator is an admin in a retail business setting, the administrator may want to create one policy for a Point-of-Sale (POS) network, one policy for an employee network, and another policy a guest Wi-Fi network. FIG. 14 is a diagram that illustrates how Shift can enable multiple policies for such a location.

The anycast DNS server 206 can have four different DNS IP addresses to which the organization's edge device can forward traffic:

8.34.34.34(primary)/8.35.35.35(secondary)
8.34.34.101(primary)/8.35.35.101(secondary)
8.34.34.102(primary)/8.35.35.102(secondary)
8.34.34.103(primary)/8.35.35.103(secondary)

To enforce multiple policies for a given location, the administrator completes the following tasks:

In the admin portal, create a separate policy for each group of users at the location, and tie each policy to one of the IP addresses above. For example, in the retail setting above, an admin creates one policy for the POS network, one for employees, and one for the guest Wi-Fi network.

In the admin portal, the policies created above are added to the appropriate location. In the retail setting illustrated above, the admin would add the three policies he created to the location, "New York."

Configure the network so that: Different groups of users at the location (each of whom will have a different policy) send traffic from different Virtual Local Area Networks (VLANs). In the example of FIG. 14, the POS network sends traffic from VLAN 10, the employee network sends traffic from VLAN 20, and the guest Wi-Fi network sends traffic from VLAN 30.

Each VLAN sends DNS requests to the DNS IP address that are tied to the appropriate policy. In the example of FIG. 14, VLAN 10 sends DNS requests to 8.34.34.101, VLAN 20 sends DNS requests to 8.34.34.102, and VLAN 30 sends DNS requests to 8.34.34.103.

Once completed, when the anycast DNS server 206 receives traffic from a user at one of its four DNS IP addresses, it will know which policy to apply to the traffic by looking at the source IP address of the traffic. In the example above, if the anycast DNS server 206 receives traffic from the address 1.1.1.1 at its 8.34.34.102 DNS IP address, it knows that the traffic is coming from one of the employees at the location and applies the employee policy the admin has configured.

Figure 15:
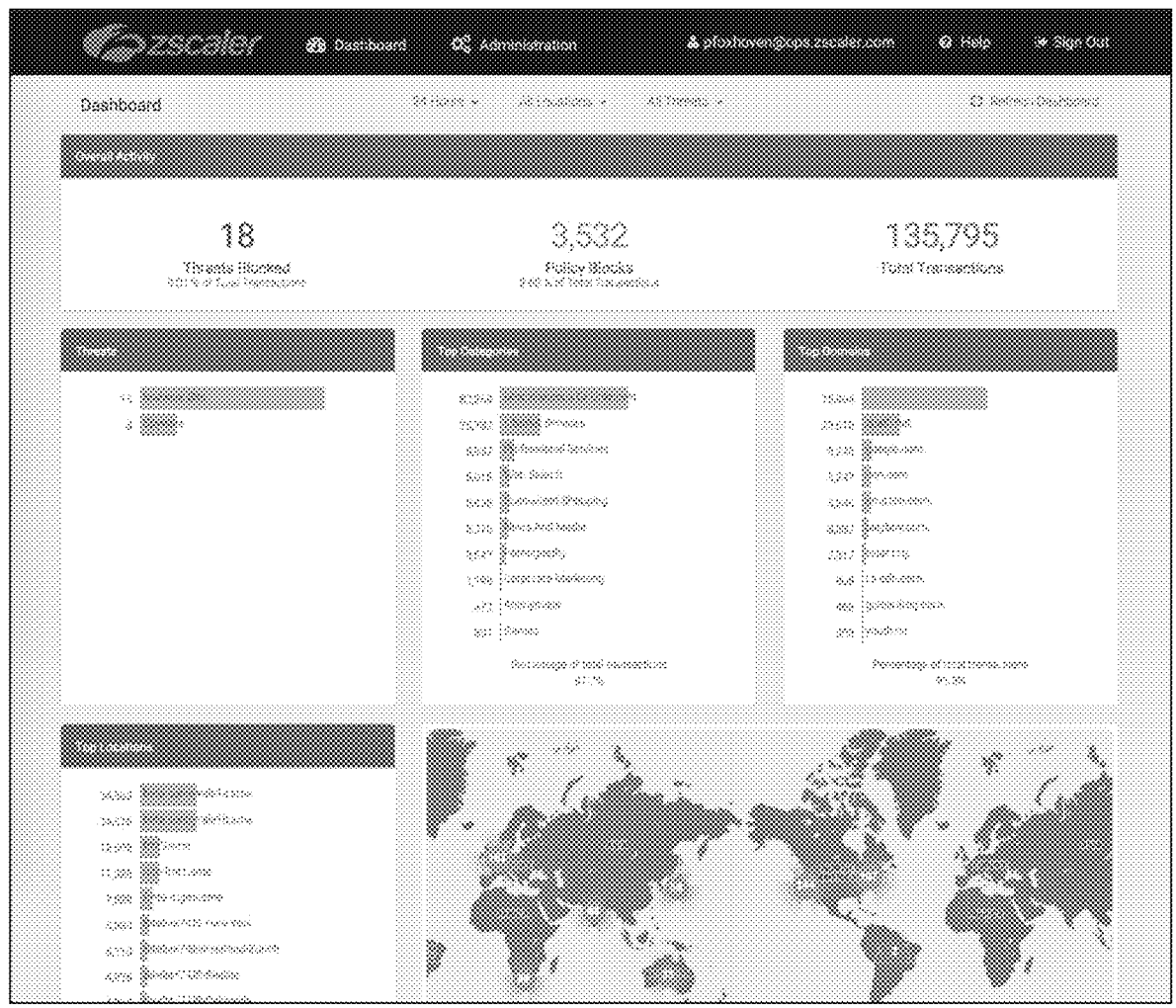
FIG. 15 is a screen shot of a dashboard of the distributed security cloud providing DNS augmented security.

Locations identify the source of the DNS queries. The anycast DNS server 206 uses the location information to apply policies. The administrator can define multiple policies per location, so different classes of users can have different levels of restrictions and filtering. A dashboard displays information about a location, such as the number of threats that were blocked and the number of transactions that were blocked due to policy. FIG. 15 is a screen shot of a dashboard of the distributed security cloud providing DNS augmented security.

The location can be defined by a static public IP address, a dynamic IP address, or a Transport Layer Security (TLS) tunnel. A location may not have a static public IP address. Instead, it may have a dynamic IP address that changes periodically because it is assigned by a service provider. Because the anycast DNS server 206 must be able to identify a location through its IP address, Dynamic DNS may be used to notify the distributed security cloud 202 when the location's IP address changes. Many routers support Dynamic DNS as part of their configuration. If a router does not support DynamicDNS, a DynDNS update client can be installed on a host machine. The update client periodically checks a network's IP address; if it sees that your IP address has changed, it updates the distributed security cloud 202 with the new IP address. Also, the distributed security cloud 202 supports configuring a TLS tunnel from an edge device to the anycast DNS server 206. Also, a location can be a single user, such as a roaming employee.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A cloud-based security method using Domain Name System (DNS), the cloud-based security method comprising:
   at a DNS server, receiving a request from a user device;
   in a distributed security cloud connected to the DNS server, performing a security check on the request based on a policy look up associated with the user device, the policy including content filter settings and security settings for the user device;
   responsive to the policy look up received from the distributed security cloud by the DNS server, performing a DNS security check on the request at the DNS server based on the content filter settings and the security settings for the user device; and
   performing one of, based on a result of the DNS security check:
   (1) directly allowing the request to the Internet by the DNS server based on the result indicating a site allowed by the policy look up including the site being one of on a whitelist and allowed by the content filter settings and the security settings;
   (2) directly blocking the request based on the result indicating a site blocked by the policy look up including the site being one of on a blacklist and blocked by one of the content filter settings and the security settings; and
   (3) providing from the DNS server, traffic associated with the request that is not directly allowed or blocked based on the DNS security check to the distributed security cloud for inline inspection based on the result of the DNS security check indicating a suspicious site or a domain known to contain malicious content, wherein the traffic is one of allowed to the Internet or blocked based on the inline inspection.

2. The cloud-based security method of claim 1, wherein the user device is configured with an associated address of the DNS server for servicing DNS requests, and wherein the DNS server is one of a plurality of DNS servers preserving geo-localization of the user device.

3. The cloud-based security method of claim 1, wherein the policy is based on a location of the user device defined by one of a static Internet Protocol (IP) address, a dynamic IP address, and a tunnel to the DNS server.

4. The cloud-based security method of claim 3, wherein the policy is one of a plurality of policies for the location, each of the plurality of policies is designated by a different address of the DNS server and different Virtual Local Area Networks (VLANs).

5. The cloud-based security method of claim 1, wherein the user device is uniquely identified with the request to the DNS server.

6. The cloud-based security method of claim 1, wherein the inline inspection performs a plurality of malicious Uniform Resource Locator (URL) filtering, antivirus/antispyware detection, deep content inspection, advanced persistent threat protection/sandboxing, and Data Loss Prevention (DLP).

7. The cloud-based security method of claim 1, wherein the policies comprise a plurality of content filtering which provides the policy for allowing or blocking the request at the DNS server, threat security which denotes a suspicious site for the request or an unknown site for the request and invokes the inline inspection, Safe Search on an application on the user device which enforces all searches on the user device with a safe search setting, Secure Sockets Layer (SSL) inspection, and black and white listing of sites which exempts or blocks sites for the request based on user provisioning.

8. A Domain Name System (DNS) server configured to perform cloud-based security using DNS, the DNS server comprising:
 a network interface communicatively coupled to a user device via the Internet;
 a processor communicatively coupled to the network interface; and
 memory storing instructions that, when executed, cause the processor to
  receive a request from the user device;
  forward the request to a distributed security cloud to perform a security check on the request based on a policy look up associated with the user device, the policy including content filter settings and security settings for the user device;
  responsive to the policy look up received from the distributed security cloud, perform a DNS security check on the request based on the content filter settings and the security settings for the user device; and
  perform one of, based on a result of the DNS security check:
   (1) directly allow the request to the Internet based on the result indicating a site allowed by the policy look up including the site being one of on a whitelist and allowed by the content filter settings and the security settings;
   (2) directly block the request based on the result indicating a site blocked by the policy look up including the site being one of on a blacklist and blocked by one of the content filter settings and the security settings; and
   (3) provide traffic associated with the request that is not directly allowed or blocked based on the DNS security check to the distributed security cloud for inline inspection based on the result of the DNS security check indicating a suspicious site or a domain known to contain malicious content, wherein the traffic is one of allowed to the Internet or blocked based on the inline inspection.

9. The DNS server of claim 8, wherein the user device is configured with an associated address of the DNS server for servicing DNS requests, and wherein the DNS server is one of a plurality of DNS servers preserving geo-localization of the user device.

10. The DNS server of claim 8, wherein the policy is based on a location of the user device defined by one of a static Internet Protocol (IP) address, a dynamic IP address, and a tunnel to the DNS server.

11. The DNS server of claim 10, wherein the policy is one of a plurality of policies for the location, each of the plurality of policies is designated by a different address of the DNS server and different Virtual Local Area Networks (VLANs).

12. The DNS server of claim 8, wherein the user device is uniquely identified with the request to the DNS server.

13. The DNS server of claim 8, wherein the inline inspection performs a plurality of malicious Uniform Resource Locator (URL) filtering, antivirus/antispyware detection, deep content inspection, advanced persistent threat protection/sandboxing, and Data Loss Prevention (DLP).

14. The DNS server of claim 8, wherein the policies comprise a plurality of content filtering which provides the policy for allowing or blocking the request at the DNS server, threat security which denotes a suspicious site for the request or an unknown site for the request and invokes the inline inspection, Safe Search on an application on the user device which enforces all searches on the user device with a safe search setting, Secure Sockets Layer (SSL) inspection, and black and white listing of sites which exempts or blocks sites for the request based on user provisioning.

15. A distributed security cloud configured to perform cloud-based security using Domain Name System (DNS), the distributed security cloud comprising:
 a DNS server communicatively coupled to a user device;
 a policy data store communicatively coupled to the DNS server and storing a policy for the user device;
 an inline inspection system communicatively coupled to the DNS server;
 wherein the DNS server is configured to
  receive a request from the user device;
  forward the request to a distributed security cloud to perform a security check on the request based on the policy associated with the user device, the policy including content filter settings and security settings for the user device;
  responsive to the policy received from the distributed security cloud, perform a DNS security check on the request based on the content filter settings and the security settings for the user device; and
  perform one of, based on a result of the DNS security check:
   (1) directly allow the request to the Internet based on the result indicating a site allowed by the policy look up including the site being one of on a whitelist and allowed by the content filter settings and the security settings;
   (2) directly block the request based on the result indicating a site blocked by the policy look up including the site being one of on a blacklist and blocked by one of the content filter settings and the security settings; and
   (3) provide traffic associated with the request that is not directly allowed or blocked based on the DNS security check to the distributed security cloud for inline inspection based on the result of the DNS security check indicating a suspicious site or a domain known to contain malicious content, wherein the traffic is one of allowed to the Internet or blocked based on inline inspection system.

16. The distributed security cloud of claim 15, wherein the user device is configured with an associated address of the DNS server for servicing DNS requests, and wherein the DNS server is one of a plurality of DNS servers preserving geo-localization of the user device.

17. The distributed security cloud of claim 15, wherein the policy is based on a location of the user device defined by one of a static Internet Protocol (IP) address, a dynamic IP address, and a tunnel to the DNS server.

18. The distributed security cloud of claim 17, wherein the policy is one of a plurality of policies for the location, each of the plurality of policies is designated by a different address of the DNS server and different Virtual Local Area Networks (VLANs).

19. The distributed security cloud of claim 15, wherein the inline inspection system performs a plurality of malicious Uniform Resource Locator (URL) filtering, antivirus/antispyware detection, deep content inspection, advanced persistent threat protection/sandboxing, and Data Loss Prevention (DLP).

20. The distributed security cloud of claim 15, wherein the policies comprise a plurality of content filtering which provides the policy for allowing or blocking the request at the DNS server, threat security which denotes a suspicious site for the request or an unknown site for the request and invokes the inline inspection, Safe Search on an application on the user device which enforces all searches on the user device with a safe search setting, Secure Sockets Layer (SSL) inspection, and black and white listing of sites which exempts or blocks sites for the request based on user provisioning.

* * * * *